US012333863B1

(12) United States Patent
Zhang et al.

(10) Patent No.: US 12,333,863 B1
(45) Date of Patent: Jun. 17, 2025

(54) LIVENESS DETECTION BASED ON GESTURE VALIDATION, FACIAL EXPRESSION ANALYSIS, AND CONCURRENCY VALIDATION

(71) Applicant: Amazon Technologies, Inc., Seattle, WA (US)

(72) Inventors: Zheng Zhang, Bellevue, WA (US); Xiang Xu, New Hyde Park, NY (US); Hao Chen, Seattle, WA (US); Jonathan Wu, Seattle, WA (US); Joseph P Tighe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 17/850,421

(22) Filed: Jun. 27, 2022

(51) Int. Cl.
*G06V 40/40* (2022.01)
*G06V 10/56* (2022.01)
*G06V 40/16* (2022.01)
*G06V 40/20* (2022.01)

(52) U.S. Cl.
CPC ............ *G06V 40/45* (2022.01); *G06V 10/56* (2022.01); *G06V 40/172* (2022.01); *G06V 40/176* (2022.01); *G06V 40/20* (2022.01)

(58) Field of Classification Search
None
See application file for complete search history.

(56) References Cited

U.S. PATENT DOCUMENTS

| 8,856,541 | B1 | 10/2014 | Chaudhury et al. |
| 9,886,639 | B2 * | 2/2018 | Martin .................. G06V 40/19 |
| 11,126,879 | B1 | 9/2021 | Vemulapalli et al. |

(Continued)

FOREIGN PATENT DOCUMENTS

| AU | 2018280235 B2 | 1/2020 |
| CA | 3041952 A1 | 4/2019 |

(Continued)

OTHER PUBLICATIONS

Android Developers, "CameraCharacteristics," Available Online at <https://developer.android.com/reference/android/hardware/camera2/CameraCharacteristics>, Mar. 17, 2022, 191 pages.

(Continued)

*Primary Examiner* — Thomas D Lee
(74) *Attorney, Agent, or Firm* — Nicholson De Vos Webster & Elliott LLP

(57) ABSTRACT

Techniques for liveness detection based on gesture validation, facial expression analysis, and concurrency validation. The techniques include selecting a color light pattern challenge and sending the color light pattern challenge to a personal computing device for display on a display screen of the personal computing device. A set of target images (video) is received by a liveness detection service in a provider network from the personal computing device as a response to the challenge. The liveness detection service analyzes the set of target images for macro-facial expression and micro-facial expressions. A liveness determination is made by the liveness detection service as to whether the user of the personal computing device is a live genuine user or an impersonated user based on the analysis of the macro and micro-facial expressions detected in the set of target images.

20 Claims, 18 Drawing Sheets

(56) References Cited

U.S. PATENT DOCUMENTS

| | | |
|---|---|---|
| 11,210,541 B2 | 12/2021 | Ding et al. |
| 11,425,562 B2 | 8/2022 | Lecun et al. |
| 11,954,940 B2 | 4/2024 | Levinski et al. |
| 2013/0188840 A1 | 7/2013 | Ma et al. |
| 2015/0324629 A1 | 11/2015 | Kim et al. |
| 2018/0046852 A1 | 2/2018 | Ionita |
| 2018/0060648 A1 | 3/2018 | Yoo et al. |
| 2018/0173980 A1 | 6/2018 | Fan et al. |
| 2018/0276488 A1 | 9/2018 | Yoo et al. |
| 2018/0307815 A1 | 10/2018 | Samadani et al. |
| 2018/0336397 A1 | 11/2018 | Smith |
| 2018/0357500 A1 | 12/2018 | Lin |
| 2019/0228248 A1 | 7/2019 | Han et al. |
| 2019/0303551 A1* | 10/2019 | Tussy .................... G06V 40/45 |
| 2019/0340349 A1 | 11/2019 | Kong |
| 2020/0082192 A1 | 3/2020 | Ding et al. |
| 2020/0184278 A1 | 6/2020 | Zadeh et al. |
| 2020/0257914 A1 | 8/2020 | Wu et al. |
| 2020/0410074 A1 | 12/2020 | Dang et al. |
| 2021/0117529 A1 | 4/2021 | Zamora et al. |
| 2022/0070239 A1 | 3/2022 | Yerli |
| 2022/0148337 A1 | 5/2022 | Meng et al. |
| 2023/0073410 A1 | 3/2023 | Tussy et al. |
| 2023/0186685 A1 | 6/2023 | Zhang et al. |
| 2023/0222842 A1 | 7/2023 | Hua et al. |

FOREIGN PATENT DOCUMENTS

| | | | |
|---|---|---|---|
| CA | 3045819 A1 | 12/2019 | |
| CA | 3133293 A1 | 4/2022 | |
| CA | 2902093 C | 3/2023 | |
| CN | 214670650 U | 11/2021 | |
| GB | 2560340 A * | 9/2018 | ......... G06K 9/00221 |
| GB | 2561607 A | 10/2018 | |
| KR | 10-2318051 B1 | 10/2021 | |
| KR | 10-2022-0030178 A | 3/2022 | |
| MY | 191774 A | 7/2022 | |
| WO | 2017/098457 A1 | 6/2017 | |
| WO | 2020/159437 A1 | 8/2020 | |
| WO | 2020/205597 A1 | 10/2020 | |
| WO | 2020/243689 A1 | 12/2020 | |

OTHER PUBLICATIONS

Android Developers, "FaceDetector", Available Online at <https://developer.android.com/reference/android/media/faceDetector>, Feb. 10, 2022, 7 pages.

Apple Developer Documentation, "AVCameraCalibrationData", Available Online at <https://developer.apple.com/documentation/avfoundation/avcameracalibrationdata>, Retrieved on Mar. 27, 2022, 2 pages.

Apple Developer Documentation, "Tracking the User's Face in Real Time", Available Online at <https://developer.apple.com/documentation/vision/tracking_the_user_s_face_in_real_time>, Retrieved on Mar. 27, 2022, 4 pages.

Apple Developer Documentation, "VNFaceLandmarks2D", Available Online at <https://developer.apple.com/documentation/vision/vnfacelandmarks2d>, Retrieved on Mar. 27, 2022, 3 pages.

Facetec, Inc., "Face Matching Overview", Available Online at <https://dev.facetec.com/matching-guide>, 2022, 3 pages.

Github, "tfjs-models/blazeface at master", tensorflow/tfjs-models, Available Online at <https://github.com/tensorflow/tfjs-models/tree/master/blazeface>, Jan. 26, 2022, 4 pages.

Google Developers, "Machine Learning for Mobile Developers", ML Kit, Available Online at <https://developers.google.com/ml-kit>, Retrieved on Mar. 27, 2022, 5 pages.

Just a Dude who Hacks, "face-api.js", Available Online at <https://justaduewhohacks.github.io/face-api.js/docks/index.html>, Retrieved on Mar. 27, 2022, 22 pages.

Ruff et al., "Deep Semi-Supervised Anomaly Detection", ICLR 2020, Available Online at <https://arxiv.org/pdf/1906.02694.pdf>, Feb. 14, 2020, pp. 1-23.

Strauss et al., "Ensemble Methods as a Defense to Adversarial Perturbations Against Deep Neural Networks", ICLR 2018, Available Online at <https://arxiv.org/abs/1709.03423>, Feb. 9, 2018, pp. 1-10.

Ushanka, White, "How to spoof IProov," YouTube, Available Online at <https://www.youtube.com/watch?v=GxJjXKJGvKw>, Dec. 30, 2021, 3 pages.

Wandell, Brian A., "Chapter 9: Color", Foundations of Vision, Stanford University, Available Online at <https://foundationsofvision.stanford.edu/chapter-9-color/>, Retrieved on Mar. 27, 2022, 43 pages.

Xu et al., "On Improving Temporal Consistency for Online Face Liveness Detection System", Computer Vision and Pattern Recognition, Available Online at <https://arxiv.org/abs/2006.06756>, Jun. 11, 2020, pp. 1-17.

Zenni Optical, "How to Measure Your Pupillary Distance (PD)", Available Online at <https://www.zennioptical.com/measuring-pd-inforgraphic>, Retrieved on Mar. 27, 2022, 10 pages.

Zhang et al., "Attacking CNN-based anti-spoofing face authentication in the physical domain", IEEE, Cryptography and Security, Available Online at <https://arxiv.org/abs/1910.00327>, Oct. 1, 2019, pp. 1-10.

Carreira et al., "Quo Vadis, Action Recognition? A New Model and the Kinetics Dataset", arXiv:1705.07750v1 [cs.CV], May 22, 2017, 10 pages.

Fan et al., "Multiscale Vision Transformers", arXiv:2104.11227v1 [cs.CV], Apr. 22, 2021, 18 pages.

Feichtenhofer et al., "SlowFast Networks for Video Recognition", arXiv:1812.03982v1 [cs.CV], Dec. 10, 2018, 11 pages.

Hou et al., "Tube Convolutional Neural Network (T-CNN) for Action Detection in Videos", arXiv:1703.10664v1 [cs.CV], Mar. 30, 2017, 11 pages.

Liu et al., "Swin Transformer: Hierarchical Vision Transformer using ShiftedWindows", arXiv:2103.14030v1 [cs.CV], Mar. 25, 2021, 13 pages.

Tran et al., "Dense Prediction for Micro-Expression Spotting based on Deep Sequence Model", Society for Imaging Science and Technology, IS&T International Symposium on Electronic Imaging 2019, Imaging and Multimedia Analytics in a Web and Mobile World 2019, 2019, pp. 401-1-401-5.

Tran et al., "Sliding Window Based Micro-Expression Spotting: A Benchmark", International Conference on Advanced Concepts for Intelligent Vision Systems, Sep. 2017, 12 pages.

Zhang et al., "SMEConvNet: a Convolutional Neural Network for Spotting Spontaneous Facial Micro-Expression From Long Videos", IEEE Access, vol. 6, Nov. 2018, pp. 71143-71151.

Zhao et al., "MaskFlownet: Asymmetric Feature Matching with Learnable Occlusion Mask", 2020 IEEE/CVF Conference on Computer Vision and Pattern Recognition (CVPR), Jun. 2020, pp. 6278-6287.

Non-Final Office Action, U.S. Appl. No. 17/708,492, filed Jul. 17, 2024, 23 pages.

Non-Final Office Action, U.S. Appl. No. 17/708,938, filed Jul. 23, 2024, 27 pages.

Final Office Action, U.S. Appl. No. 17/708,938, filed Nov. 15, 2024, 36 pages.

Non-Final Office Action, U.S. Appl. No. 17/708,406, filed Nov. 18, 2024, 34 pages.

Notice of Allowance, U.S. Appl. No. 17/708,492, filed Jan. 10, 2025, 9 pages.

Notice of Allowance, U.S. Appl. No. 17/708,492, filed Oct. 22, 2024, 10 pages.

Advisory Action, U.S. Appl. No. 17/708,938, Jan. 28, 2025, 8 pages.

Final Office Action, U.S. Appl. No. 17/708,406, Mar. 6, 2025, 29 pages.

* cited by examiner

CUT PATTERN 302

———— T1 ———— T2 ———— T3 ———— T4 ————▶

CUT PATTERN WITH GAP 304

———— T1 ———— T2 ———— T3 ———— T4 ————▶

HORIZONTAL WIPE PATTERN 306

———— T1 ———— T2 ———— T3 ———— T4 ————▶

VERTICAL WIPE PATTERN 308

———— T1 ———— T2 ———— T3 ———— T4 ————▶

US 12,333,863 B1

LIVENESS DETECTION BASED ON GESTURE VALIDATION, FACIAL EXPRESSION ANALYSIS, AND CONCURRENCY VALIDATION

TECHNICAL FIELD

The present disclosure relates generally to biometric authentication. Specifically, the present disclosure relates to computer-implemented techniques for liveness detection based on gesture validation, facial expression analysis, and concurrency validation.

BACKGROUND

The rapid development of deep machine learning techniques has increased the prevalence of face authentication systems for web services. Face authentication is a form of biometric authentication in which a human face depicted in a set of one or more digital images (e.g., a set of one or more video frames) is authenticated. For example, the face can be captured in the set of images by a digital video camera such as one integrated with or coupled to the user's smart phone, laptop computer, or desktop computer. A face authentication system can be programmed or configured to use deep machine learning techniques to analyze the set of images to determine if the face depicted in the set of images is a known face.

Unfortunately, human faces can be easily captured and reproduced. This makes face authentication systems vulnerable to a variety of attacks. In a presentation attack, an attacking user presents a presentation attack instrument representing an impersonated face to the camera. The presentation attack instrument can be, for example, a photograph of the impersonated face, a video screen displaying the impersonated face, or a mask of the impersonated face that is worn by the attacking user. In an injection attack, a set of one or more images of the impersonated face that is pre-generated or generated in real-time is injected into the input data stream consumed by the face authentication system. In a deepfake attack, a set of one or more images of an impersonated face is injected into the input data stream like with an injection attack, however, deep artificial intelligence techniques are used to generate a set of one or more hyper-realistic images of the impersonated face. With a presentation attack, a video injection attack, or a deepfake attack, the face authentication system can be tricked into authenticating the impersonated face.

The software and web services industry has, in response, introduced a number of products and technologies to address and minimize these threats, including "liveness detection"-designed to keep malicious users from authenticating with a computer system, web service, or provider network as another person without the other person's permission or knowledge. A typical liveness detection technique incorporates a challenge-response protocol. The user to be authenticated is presented with a challenge. The user can respond in accordance with the challenge instructions. The challenge response can then be verified to determine if the response is by a live human and is fresh (e.g., not pre-recorded or pre-generated). Some example challenges can include asking the user to blink their eyes, reading words or reading numbers aloud, head movements, and handheld camera movements.

Unfortunately, attacking users can still bypass liveness detection techniques using modern computer technology such as high-powered graphics processing units (GPUs) and virtual camera software. Thus, improvements to liveness detection techniques that reduce or eliminate the threat of presentation, injection, or deepfake attacks would be appreciated.

BRIEF DESCRIPTION OF DRAWINGS

Various examples in accordance with the present disclosure will be described with reference to the drawings, in which.

DETAILED DESCRIPTION

The present disclosure relates to methods, apparatuses, systems, and non-transitory computer-readable media for liveness detection based on gesture validation, facial expression analysis, and concurrency validation.

In some examples, the techniques encompass a method for liveness detection based on facial expression analysis. The method includes selecting a color light pattern challenge for display on a display screen of a personal computing device. The method further includes receiving a set of target images (video) from the personal computing device as a response to the challenge. A liveness detection service in a provider network analyzes the set of target images for macro-facial expressions and micro-facial expressions. A liveness determination is made by the liveness detection service as to whether the user of the personal computing device is a live genuine user or an impersonated user based on the analysis of the macro and micro-facial expressions detected in the set of target images.

In some examples, the method for liveness detection is further based on gesture validation. The method includes causing a face bounding shape challenge to be displayed on the display screen of the personal computing device. The face bounding shape challenge is designed to induce motion by the user of the personal computing device. The liveness detection service can make the liveness determination based on classifying motion of a detected/tracked face in the set of target images as to liveness.

In some examples, the method for liveness detection is further based on concurrency validation. The method includes determining a temporal consistency between the times spotted macro or micro-facial expressions appear in the set of target images and the times of color transitions in the selected color light pattern challenge are displayed on the display screen or the time of the face bounding shape challenge is displayed on the display screen.

Any of the disclosed techniques may be used in lieu or conjunction with existing or other techniques for liveness detection.

Face Authentication Process

Figure 1:
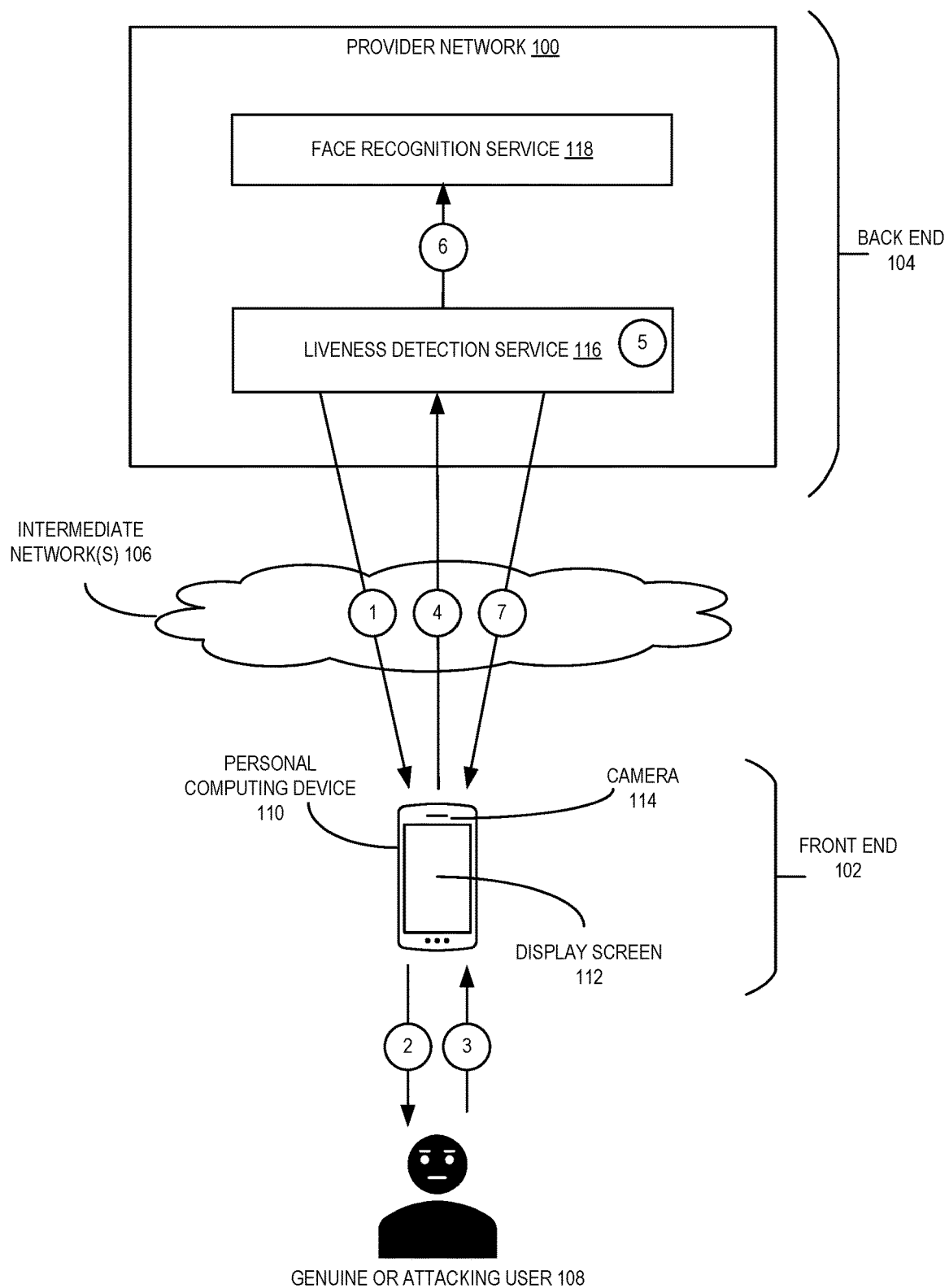
FIG. 1 illustrates a face authentication computer system in the context of a provider network environment, according to some examples.

FIG. 1 illustrates a face authentication computer system in the context of a provider network environment, according to some examples. Steps of a face authentication process are represented in FIG. 1 by numbered circles. Directional arrows in FIG. 1 represent a direction of data flow between respective components within the system but not necessarily the exclusive direction. Data that flows between depicted components can traverse one or more intermediate components (e.g., network devices or other computing devices). Such an intermediate component may not be depicted in FIG. 1 for the purpose of providing a clear example.

At a high-level, the system can have various components including front end 102 and back end 104. Front end 102 and back end 104 can be interconnected by a set of one or more intermediate networks 106. A network in the set of intermediate networks 106 can be any suitable data communications network such as, for example, a suitable wired or wireless data communications network. Non-limiting examples of such a network include a wired or wireless Personal Area Network (PAN), a wired or wireless Local Area Network (LAN), a Virtual Private Network (VPN), a Campus Area Network (CAN), a Metropolitan Area Network (MAN), an Enterprise Private Network (EPN), a Home Area Network (HAN), a Wide Area Network (e.g., the Internet), etc.

Front end 102 can encompass personal computing device 110. Device 110 can be configured with or coupled to video display screen 112 and digital camera 114. User 108 can be a genuine user or an attacking user. An attacking user can be a user that uses device 110 to impersonate another user (impersonated user) using a presentation attack, an injection attack, or a deepfake attack. A genuine user can be a user that uses device 110 that is not an attacking user.

In the case of a presentation attack, the face of the impersonated user can be depicted by a physical presentation attack instrument. The presentation attack instrument can be presented to camera 114 by an attacking user to attempt to cause liveness detection service 116 to determine that the presentation attack instrument is a genuine face. For example, the presentation attack instrument might be a printed paper that depicts the impersonated user's face, a video display screen that displays an image or a video of the impersonated user's face, or a mask of the impersonated user worn by the attacking user. A set of one or more images of the presentation attack instrument captured by camera 114 can be sent from device 110 to liveness detection service 116. If liveness detection service 116 determines that a detected/tracked face in the set of images that is a genuine face, then the presentation attack can be successful.

In the case of an injection attack, the face of an impersonated user can be depicted in a set of one or more images that are pre-generated or pre-recorded prior to initiation of the face authentication process or generated in real time during the face authentication process. The set of images can be sent from device 110 to liveness detection service 116. If liveness detection service 116 determines that a detected/tracked face in the set of images is a genuine face, then the injection attack can be successful.

In the case of a deepfake attack, a set of one or more target images containing a synthetically generated face of an impersonated user can be generated in real-time during the face authentication process using deep artificial intelligence techniques. A deepfake attack can additionally or alternatively include use of a deep artificial intelligence image relighting technique to synthetically relight a face in an input image to produce an output image of a relit face or to generate a relit image corresponding to a rotation of the original illumination of an input image. The set of images can be sent from device 110 to liveness detection service 116. If liveness detection service 116 determines that a detected/tracked face in the set of images is a genuine face, then the deepfake attack can be successful.

To combat these and other attacks, when user 108 commences the face authentication process, liveness detection service 116, at Step 1, can generate and send a liveness challenge to personal computing device 110. As an alternative, the liveness challenge or portion thereof can be generated at device 110 instead of being generated by liveness detection service 116. Techniques for generating various liveness challenges including a color light pattern challenge and a face bounding shape challenge are described in greater detail elsewhere herein.

At Step 2, personal computing device 110 can present the liveness challenge to user 108 on screen 112. For example, device 110 can present the face bounding shape challenge or the color light pattern challenge. In some examples, device 110 presents just the face bounding shape challenge during the face authentication process. In some examples, device 110 presents just the color light pattern challenge during the face authentication process. In some examples, device 110 does not present either the face bounding shape challenge or the color light pattern challenge during the face authentication process. In some examples, device 110 presents both the face bounding shape challenge and the color light pattern challenge during the face authentication process.

At Step 3, user 108 can provide a response to the liveness challenge. The response can be captured and encoded at device 110 as a set of one or more digital images. The response may vary depending on the liveness challenge. For the face bounding shape challenge, the response by user 108 can include user 108 moving their face as displayed on screen 112 to tightly fit within a face bounding shape displayed on screen 112. For the color light pattern challenge, the response by user 108 can include user 108 holding their face relatively stationary while facing camera 114 and screen 112 and while a color light pattern is displayed on screen 112. Other responses by user 108 might include blinking of the eyes or mouthing words as instructed by the liveness challenge.

In this disclosure, the term "digital image" or "image" refers broadly to data, including any lossless or lossy encoded or compressed variant of the data, that numerically represents a set of picture elements or "pixels." For example, an image can be a Red, Green, and Blue (RGB) image where each pixel is represented by at least three numerical values, one for each of the red, green, and blue channels. Or an image can be a greyscale image where each pixel is represented by at least a numerical value representing the light intensity of the pixel. The data that numerically represents a set of pixels of an image can be video frame data such as, for example, intraframe (I-frame) data, predicted frame (P-frame) data, or bidirectionally predicated frame (B-frame) data. For example, a set of images can be sent from device 110 over set of intermediate networks 106 to liveness detection service 116 encoded as MP4 video or the like. Liveness detection service 116 or other component of provider network 110 can decode the MP4 video to obtain the set of images on which liveness analysis can be conducted.

At Step 4, a set of one or more "target" images can be sent by device 110 to liveness detection service 116. As used herein, a "target" image encompasses an image that is the subject of a liveness detection analysis. A target image can be an image captured by camera 114, a pre-recorded or pre-generated image or an image generated in real time as in an injection attack, or an image generated using deep artificial intelligence techniques as in a deepfake attack. For example, the set of target images can be streamed from device 110 to liveness detection service 116 as camera 114 captures the response by user 108 to the liveness challenge. In the case user 108 is an attacking user, some or all of the target images in the set of target images sent by device 110 to liveness detection service 116 may be based on a presentation attack, an injection attack, or a deepfake attack.

At Step 5, liveness detection service 116 can determine whether a face detected/tracked in the set of target images is a genuine face. Various techniques that can be employed by liveness detection service 116 to determine whether a detected/tracked face in the set of target images is a genuine face are described in greater detail elsewhere herein.

If liveness detection service 116 determines that a detected/tracked face is a genuine face, then, at Step 6, liveness detection service 116 can provide face authentication data to face recognition service 118 by which face recognition service 118 can authenticate the detected/tracked face (e.g., determine an identity of the detected/tracked face). The provided face authentication data can include any data based on which face recognition service 118 can use to determine whether the detected/tracked face is a known face or an unknown face. For example, the provided authentication data can include one or more of the target images, a representative image of the detected/tracked face derived from a target image, an embedding (e.g., a matrix of numbers) representing the detected/tracked face, or other suitable authentication data.

On the other hand, if liveness detection service 116 determines that the detected/tracked face is not a genuine face, then, at Step 7, liveness detection service 116 can provide data to device 110 that indicates that the face authentication process failed.

A role of liveness detection service 116 within provider network 100 can be to ensure that face recognition service 118 authenticates only genuine detected/tracked faces. In this sense, liveness detection service 116 can be viewed as a protective screen or filter on the detected/tracked faces that are permitted to be authenticated by face recognition service 118. Thus, liveness detection service 116 can be programmed or configured with techniques that focus on discriminating between genuine detected/tracked faces and not genuine (e.g., impersonated) detected/tracked faces without regard to the identity of the detected/tracked face depicted (e.g., whose face it is). And face recognition service 118 can be programmed or configured with techniques that focus on ascertaining the identity of the detected/tracked face assuming liveness detection service 116 has already determined that the detected/tracked face is genuine.

While personal computing device 110 is depicted in FIG. 1 as a smartphone or the like, personal computing device 110 can be another type of personal computing device such as, for example, a desktop computer (PC), a laptop computer, a tablet computer, a smart television or other smart in-home device, an in-vehicle computing device, or other type of personal computing device.

Display screen 112 can be a standard RGB output device or television or video display or the like such as, for example, a Cathode-Ray Tube (CRT), Liquid Crystal Display (LCD), plasma, organic light-emitting diode (OLED), quantum dot, or type of RGB television set, computer or smartphone display, multicolor Light Emitting Diode (LED) display, etc. While screen 112 can be integrated in the form factor of device 110 such as depicted in FIG. 1, screen 112 can be a peripheral device such as, for example, a desktop computer monitor attached to device 110 by a physical cable.

Camera 114 can be a standard RGB input device or color television or video camera or the like such as, for example, a digital camera based on charge-coupled device (CCD) or complementary metal-oxide semiconductor (CMOS) technology. Camera 114 can operate according to the RGB color model or a variation thereof (e.g., using a Bayer filter arrangement). For example, camera 114 can be a standard visible light smartphone camera, webcam, IP camera, etc. Like screen 112, camera 114 can be integrated into the form factor of device 110 or attached by cable or wireless connection to device 110. In some examples, both screen 112 and camera 114 are oriented in the same or approximately the same direction such that when the face of user 108 is facing screen 112, then user 108 is also facing the lens of camera 114.

In the case where user 108 is an attacking user, a standard RGB input device can be mimicked by virtual camera software. Thus, unless the context clearly indicates otherwise, reference herein to camera 114 encompasses both a standard RGB input device like one of those described in the preceding paragraph and a virtual camera such as a virtual camera implemented by virtual camera software. Accordingly, unless the context clearly indicates otherwise, reference herein to a target image captured by camera 114 encompasses a target image captured by a standard RGB input device such as one of those described in the preceding paragraph or a target image produced or generated by a virtual camera such as a virtual camera used in an injection or deepfake attack.

Back-end 104 encompasses liveness detection service 116 and face recognition service 118 of provider network 100. Each of liveness detection service 116 and face recognition service 118 can be implemented by one or more computing devices of provider network 100. Liveness detection service 116 can encompass instructions configured when executed to perform the liveness detection techniques disclosed herein.

Provider network 100 can be programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 can unilaterally provision computing capabilities in provider network 100, such as server time and network storage, as needed automatically without requiring human interaction with each service provider.

Capabilities of provider network 100 can be available over set of intermediate networks 106 and accessed through standard mechanisms that promote use by heterogeneous thin or thick client platforms such as mobile phones, tablets, laptops, and workstations. Computing resources such as storage, processing, memory, and network bandwidth in provider network 100 can be pooled to serve multiple users using a multi-tenant model, with different physical and virtual resources dynamically assigned and reassigned according to user demand. There can be a sense of location independence in that the user generally can have no control or knowledge over the exact location of provided resources but can be able to specify location at a higher level of abstraction such as, for example, at the level of a country, state, or datacenter.

Provider network 100 can automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the user of a utilized service.

Provider network 100 can provide its capabilities to users according to a variety of different service models including Software-as-a-Service ("SaaS"), Platform-as-a-Service ("PaaS"), and Infrastructure-as-a-Service ("IaaS").

With SaaS, a capability can be provided to a user using the provider's software applications running on the infrastructure of provider network 100. The applications can be accessible from various client devices through either a thin client interface such as a web browser, or an API. The infrastructure can include the hardware resources such as server, storage, and network components and software deployed on the hardware infrastructure that are necessary to support the services being provided. Typically, under the SaaS model, the user does not manage or control the underlying infrastructure including network, servers, operating systems, storage, or individual application capabilities, except for limited user-specific application configuration settings.

With PaaS, the user can be provided the capability to deploy onto hardware and software infrastructure of provider network 100 user-created or acquired applications using programming languages, libraries, services, and tools supported by the provider or other sources. Typically, under the PaaS model, the user does not manage or control the underlying hardware and software infrastructure including network, servers, operating systems, or storage, but can have control over the deployed applications and possibly configuration settings for the application-hosting environment.

With IaaS, the user can be provided the capability to provision processing, storage, networks, and other fundamental computing resources where the user can deploy and run arbitrary software, which can include operating systems and applications. The user typically does not manage or control the underlying hardware and software infrastructure but can have control over operating systems, storage, and deployed applications and possibly limited control of selecting network components such as, for example, host firewalls.

Provider network 100 can provide its capabilities to a user according to a variety of different deployment models including as a private cloud, as a community cloud, as a public cloud, or as a hybrid cloud.

In a private cloud, the hardware and software infrastructure of provider network 100 can be provisioned for exclusive use by a single organization which can comprise multiple users (e.g., business units). The private cloud can be owned, managed, and operated by the organization, a third party, or some combination of them, and it can exist on or off premises.

In a community cloud, the hardware and software infrastructure of provider network 100 can be provisioned for exclusive use by a specific community of users from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure can be provisioned for open use by the public. The public cloud can be owned, managed, and operated by a business, academic, or government organization, or some combination of them. A public cloud can exist on the premises of the public cloud provider.

In a hybrid cloud, the infrastructure can be a composition of two or more distinct cloud infrastructures (private, community, or public) that remain unique entities, but that can be bound together by standardized or proprietary technology that enables data and application portability such as, for example, cloud bursting for load balancing between clouds.

To provide resource services to user, provider network 100 can rely upon virtualization techniques. For example, virtualization technologies can provide users the ability to control or use compute resources (e.g., a "compute instance," such as a virtual machine (VM) using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by provider network 100 to perform a variety of computing tasks. Additionally, or alternatively, a user can indirectly use a compute resource by submitting code to be executed by provider network 100, which in turn can use one or more compute resources to execute the code—typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across set of intermediate networks 106 (e.g., the Internet, a cellular network, etc.) via an interface, such as through use of an application programming interface (API) call, via a console implemented as a website or web application, etc.

An API can refer to an interface or communication protocol between a client and a server, such that if the client makes a request in a predefined format, the client can receive a response in a specific format or initiate a defined action. In context of provider network 100, an API can provide a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Liveness Detection Based on Display Screen Light Reflections

According to some examples, a defense against presentation, injection, and deepfake attacks using display screen light reflections is provided. Specifically, screen 112 can be used to emit a color light pattern challenge. The color light pattern challenge can be reflected by the face of user 108. Camera 114 can capture the reflection of the color light pattern challenge off the face of user 108 in a set of target images. The set of target images can be sent to liveness detection service 116 for analysis to determine whether a detected/tracked face in the set of target images is genuine or not. Where user 108 is genuine, the color, luminance, and luminance gradients of the face-reflected light in the set of target images should correspond to the color, luminance, and luminance gradients of the color light pattern challenge displayed on screen 112.

In some examples, the color, luminance, and luminance gradients of the color light pattern challenge displayed on screen 112 can be randomized to mitigate an injection attack or a deepfake attack. An injection attack or a deepfake attack can be mitigated because the randomized elements of the color light pattern challenge are not determinable at device 110 until the randomized elements are selected or presented on screen 112. As a result, the face-reflected light in a pre-generated injected image or deepfake image may not match the face-reflected light of the randomized color light pattern challenge or it can be more difficult or impractical to dynamically generate an injected image or deepfake image in real-time with face-reflected light that matches the face-reflected light of the randomized color light pattern challenge.

In some examples, upon receiving a set of target images from device 110, liveness detection service 116 can measure the correspondence between one or more of: (1) the colors of the face-reflected light in the set of target images and the colors of the color light pattern challenge, (2) the luminance of the face-reflected light in the set of target images and the luminance of the color light pattern challenge, and (3) the luminance gradients of the face-reflected light in the set of target images and the luminance gradients of the color light pattern challenge. If user 108 is genuine, then all of these should correspond. If one or more do not correspond, then user 108 may be an attacking user.

When the color light pattern challenge is presented on screen 112, camera 114 can capture the light from screen 112 that is reflected by the face of user 108. Image sensors of camera 114 can correspond to a set of pixels. The set of pixels can capture the light emitted from screen 112 reflected off the face of user 108 to form an image. Each pixel x of the image on the face can represent an intensity response of the corresponding sensor of the incoming light. The pixel light intensity response of a camera pixel x on the face can be approximated in some examples with a linear diagonal map based on the Von Kries coefficient law as follows:

$$I_c(x) = E_c(x) \times R_c(x), c \in \{R,G,B\}$$

Here, the variable x can represent a camera pixel on the face of user 108. The variable $E_c$ can represent the illuminant spectral power distribution of the color channel c (e.g., red, green, or blue). The variable $R_c$ can represent the reflectance of the color channel c.

The light intensity response of pixel x can be triggered by multiple illuminant sources including the light emitted from screen 112 reflected off the face of user 108 and the ambient lighting of the environment where user 108 is physically located. Assuming user 108 is facing both screen 112 and camera 114, the light intensity response for a camera pixel x on the face of user 108 is modeled in some examples as a linear combination of: (1) the light intensity response of the camera pixel x by the light of screen 112 reflected off the face of user 108 and (2) the light intensity response of the camera pixel x by the environmental illuminant sources excluding screen 112, as follows:

$$\hat{I}_c(x) = E_c^s(x) \times R_c(x) + E_c^e(x) \times R_c(x), c \in \{R,G,B\}$$

In this equation, the variable $E_c^s$ can represent the illuminant source from screen 112. The variable $E_c^e$ can represent illuminant sources other than screen 112 in the environment where user 108 is located. From this equation, if the light intensity of screen 112 is varied while the light intensity of other illuminant sources in the environment stays relatively constant, then the light intensity response of a camera pixel capturing the varying light reflected off the face of user 108 can vary in proportion to the varying light intensity of screen 112. If user 108 is genuine, then the face of user 108 is likely to be a relatively close reflective object to screen 112. With this then, a genuine user can be distinguished from an attacking user by comparing the color, luminance, and transitions of face-reflected light in the set of target images with the color, luminance, and transitions of the color light pattern challenge emitted from screen 112.

Figure 2:
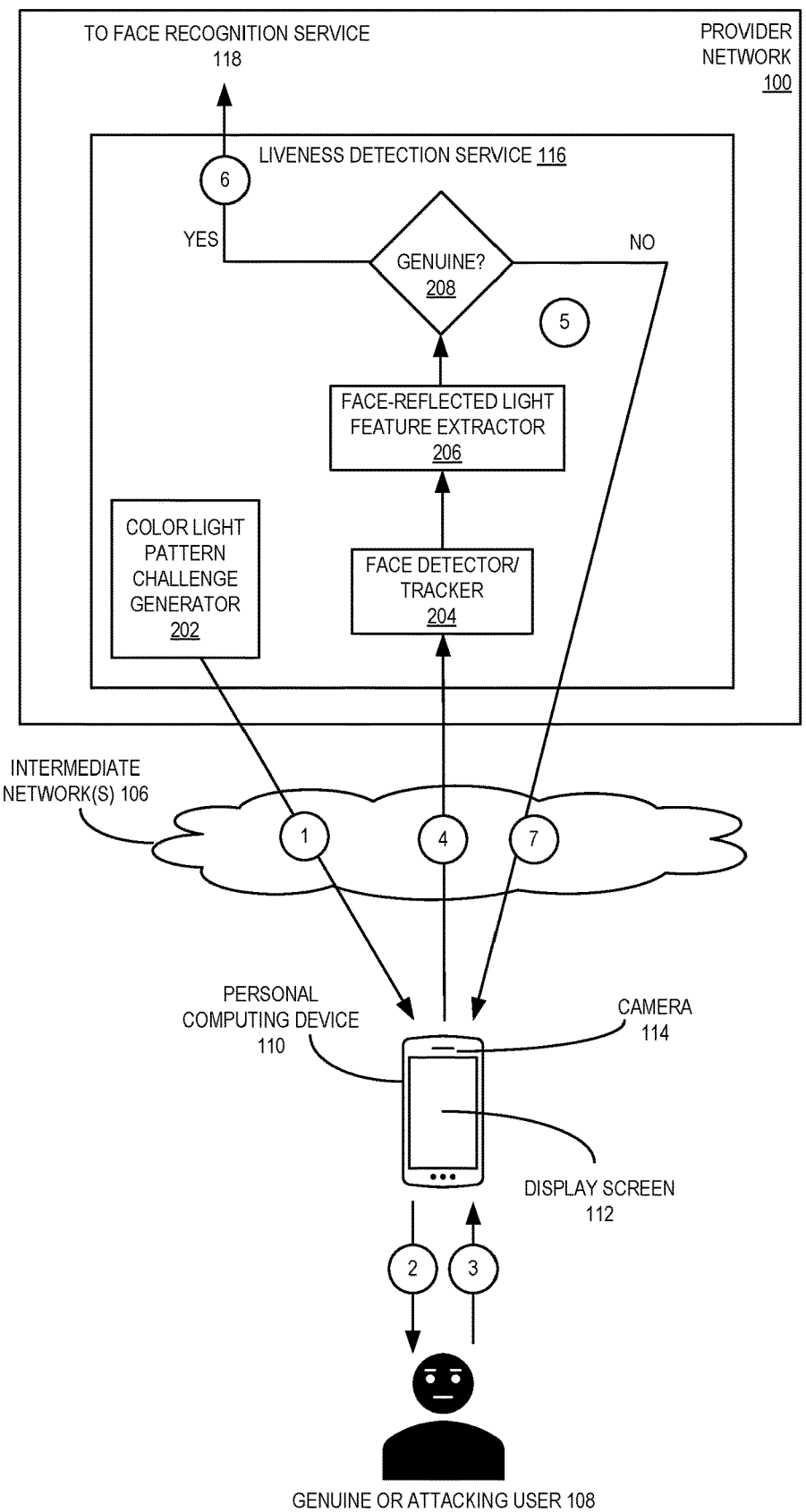
FIG. 2 illustrates a face authentication computer system in which a liveness detection service is programmed or configured to perform liveness detection using display screen light reflections, according to some examples

FIG. 2 illustrates the face authentication computer system of FIG. 1 and in which liveness detection service 116 can be programmed or configured to perform liveness detection using display screen light reflections, according to some examples. Using display screen light reflections for liveness detection is described below in the context of the face authentication process described above with respect to FIG. 1. Like FIG. 1, steps of the face authentication process that uses display screen light reflections for liveness detection are depicted in FIG. 2 as numbered circles. Directional arrows represent a direction of data flow between connected components but not necessarily the exclusive direction. Data represented by directed arrows in FIG. 2 that flows between depicted components can traverse one or more intermediate components (e.g., an intermediate network or computing device). Such an intermediate component may not be depicted in FIG. 2 for the purpose of providing a clear example.

At Step 1, color light pattern challenge generator 202 can be programmed or configured to select a set of one or more colors to display on screen 112. The color light pattern challenge can include a set of randomly selected colors.

Each color can be defined by a Red, Green, and Blue (RGB) value. In some examples, colors to include in the color light pattern challenge are randomly selected from the following set of possible colors: red (255, 0, 0); orange (255, 165, 0); yellow (255, 255, 0); lime green (0, 255, 0); green (0, 128, 0); cyan (0, 255, 255); blue (0, 0, 255); purple (128, 0, 128); violet (143, 0, 255); white (255, 255, 255), and black (0, 0, 0). However, instead of selecting from a set of discrete colors, colors can be randomly selected within a range of one or more of the individual red, green, or blue color channel values.

The color light pattern challenge can also encompass a sequence (ordering) of the selected colors. The sequence can correspond to the order in which the colors are displayed on screen 112. Different combinations are possible. For example, the sequence can be selected by ordered sampling with replacement. In this case, the probability of correctly guessing the sequence can be 1 in $N^K$ where N represents the number of possible colors and K represents the length of the color light pattern challenge in which colors can be repeated. Thus, for a five-element color light pattern challenge selected by ordered sampling with replacement from nine possible colors, the probability of correctly guessing the sequence is 1 in $9^5$, or 1 in 59,049.

In some examples, using the color light pattern challenge for liveness detection is just one of a set of multiple challenges presented to user 108 at Step 2. A combination of challenges can decrease the probability that an attacking user can successfully authenticate as an impersonated user relative to using a single challenge or fewer challenges. For example, the color light pattern challenge can be combined with one or more other challenges such as, for example, requesting user 108 to blink their eyes, read words or read numbers aloud, or move their head. In some examples described in greater detail elsewhere herein, user 108 can be requested to position their face within a face bounding shape (e.g., an oval) displayed on screen 112. Once user 108 has positioned their face within the face bounding shape or while user 108 is positioning their face within the shape, the color light pattern challenge can be presented on screen 112. The combination of challenges can make it more difficult for an attacking user to impersonate the face of another user while successfully meeting both challenges compared to the difficulty of having to only meet one of the challenges alone.

Figure 3:
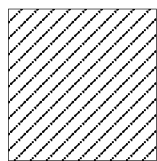
FIG. 3 illustrates some possible color light pattern challenges, according to some examples.
Figure 3:
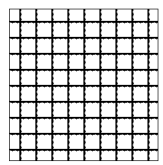
Figure 3:
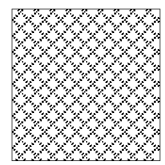
Figure 3:
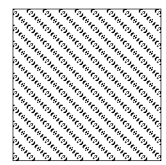
Figure 3:
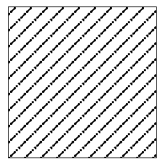
Figure 3:
Figure 3:
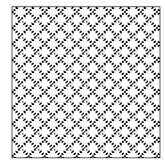
Figure 3:
Figure 3:
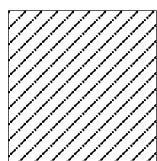
Figure 3:
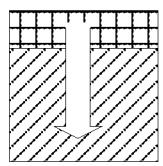
Figure 3:
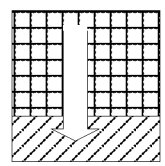
Figure 3:
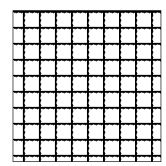
Figure 3:
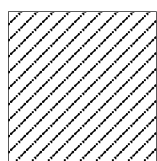
Figure 3:
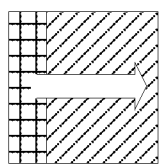
Figure 3:
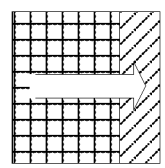
Figure 3:
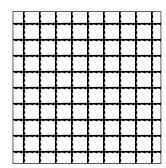

Various color light pattern challenges are possible. FIG. 3 illustrates some possible color light pattern challenges, according to some examples. Different color elements are depicted by different fill patterns due to standard patent application drawings being limited to black and white coloring.

With cut pattern 302, the entire screen 112 or substantially the entire screen 112 can present a single-color element at a time. Transitions from one color element to the next color element in the sequence can be made by hard cutting from one color element to the next. Each color element can be displayed on screen 112 for a short period of time. No particular length of time is required and the length of time for which a color element is displayed on screen 112 can be selected according to the requirements of the particular implementation at hand.

Various factors can affect the selection of the length of time for which a color element is displayed. For example, the length of time can be selected to reduce the risk of triggering photosensitive epilepsy or otherwise physically disturbing user 108 from too rapid of transitions between different color elements. The length of time can also be selected so that a color element is displayed on screen 112 for at least multiple video frames captured by camera 114 in case some of the video frames are unusable because user 108 was moving their head, scratching their nose, or otherwise interfering with the face-reflection of the displayed color element.

In example cut pattern 302, a first color element is displayed on screen 112 at time T1, a second color element is displayed on screen 112 at time T2 that immediately follows time T1, a third color element is displayed on screen 112 at time T3 that immediately follows time T2, and a fourth color element is displayed on screen 112 at time T4 that immediately follows time T3. While four color elements are depicted in example cut pattern 302, fewer or more color elements can be displayed on screen 112 in a cut pattern or, more generally, in a color light pattern challenge.

While cut pattern with gap 304, the entire screen 112 or substantially the entire screen 112 can present one color element at a time like with cut pattern 302. However, the sequence can alternate between highly reflective color elements and less reflective color elements. By alternating so, greater reflective contrast can be provided between color elements. In some examples, the highly reflective color elements can be selected from a set that includes orange, red, cyan, yellow, green, blue, and purple and where the less reflective color element is black. In some examples, the highly reflective color elements can be selected from a set that includes orange, red, cyan, and yellow and the less reflective color elements can be selected from a set that includes green, blue, and purple. White can also be used as a highly reflective color element.

Horizontal wipe pattern 306 can be an animated pattern where transitions between successive color elements can be made according to a horizontal wipe transition from the current color element to the next color element in the color light pattern challenge. Vertical wipe pattern 308 can be like pattern 306 except transitions can be animated using vertical wipe transitions as opposed to horizontal wipe transitions. A diagonal wipe pattern is also possible. It is also possible for a color light pattern challenge to contain some mix of horizontal, vertical, or diagonal wipe transitions.

In any case, with a wipe pattern, the next color element in the color light pattern challenge can be animated in a wipe transition to overtake the currently displayed color element until the next color element occupies all or substantially all of screen 112. This process can repeat with any additional color element in the sequence until all color elements in the sequence are displayed on screen 112.

Before the animated transition to the next color element in the sequence is started, the current color element can be displayed on screen 112 for a short period of time, or the wipe transition to the next color element can start as soon as the prior transition completes. The rate of the transition can be selected based on various factors according to the requirements of the particular implementation at hand. No particular transition rate is required.

For example, the transition rate can be selected to reduce the risk of triggering photosensitive epilepsy or otherwise physically disturbing user 108 from too rapid of transitions between different color elements. The transition rate can also be selected so that the wipe transition occurs over multiple video frames captured by camera 114 in in case some of the video frames are unusable because user 108 was moving their head, scratching their nose, or otherwise interfering with the face-reflection of the displayed color element.

In example horizontal wipe pattern 306, a first color element is displayed on screen 112 at time T1 and a second color element is animated in a wipe transition in the direction indicated by the arrow over times T2, T3, and T4 until the second color element occupies the entire screen 112 or substantially the entire screen 112. This can repeat for additional color elements. While in the example horizontal wipe pattern 306 the wipe transitions animate from the top of screen 112 toward the bottom of screen 112, a horizontal wipe pattern can also transition from the bottom of screen 112 toward the top of screen 112.

Vertical wipe pattern 308 is like horizontal wipe pattern 306 except that the wipe transition is vertically oriented as opposed to horizontally oriented as in pattern 306. While in the example vertical wipe pattern 308 the wipe transitions animate from the left side of screen 112 toward the right side of screen 112, a vertical wipe pattern can also transition from the right side of screen 112 toward the left side of screen 112.

In a variation of a wipe pattern, to provide a greater luminance contrast between color elements, each color element can be transitioned in over a black or dark background displayed on screen 112 as opposed to the previous color element selected for inclusion in the color light pattern challenge.

In some examples, a wipe pattern can be used because it provides a face-reflected light gradient from a more reflective color element to a less reflective color element or from a less reflective color element to a more reflective color element for each wipe transition in the sequence. The face-reflected light gradient results from the animated wipe transition where a first color element having a first luminance is gradually replaced during the transition with a second color element having a second luminance that is lower or higher than the first luminance. This face-reflected light gradient can be captured by camera 114 in the set of target images. Liveness detection service 116 can determine the liveness of a detected/tracked face in the set of target images received from front-end 102 by measuring the correspondence between the luminance gradients of the color light pattern challenge emitted from screen 112 and the luminance gradients of the face-reflected light in the set of target images.

Where a wipe pattern is used for the color light pattern challenge, this measuring can include measuring the correspondence between luminance gradients of the wipe transitions in the color light pattern challenge emitted from screen 112 and the luminance gradients of the face-reflected light in the set of target images. By doing so, mounting a successful injection attack or deepfake attack can be made more improbable.

Returning to FIG. 2, at Step 2, the color light pattern challenge can be displayed on screen 112. At Step 3, the response to the display of the color light pattern sequence can be captured by camera 114 in the set of target images. If user 108 is genuine, then the set of target images can include the face-reflected light from the face of user 108 that is caused by the display of the color light pattern sequence on screen 112 while user 108 is facing screen 112 and camera 114. If user 108 is an attacking user, then the set of target images can include one or more images based on a presentation, injection, or deepfake attack.

At Step 4, the set of target images can be sent from front-end 102 to back end 104. The set of target images can be sent (streamed) from front end 102 to back end 104 in real-time in Step 4 as the color light pattern challenge is displayed on screen 112 in Step 2 and as the response by user 108 is captured by camera 114 at Step 3.

Figure 4:
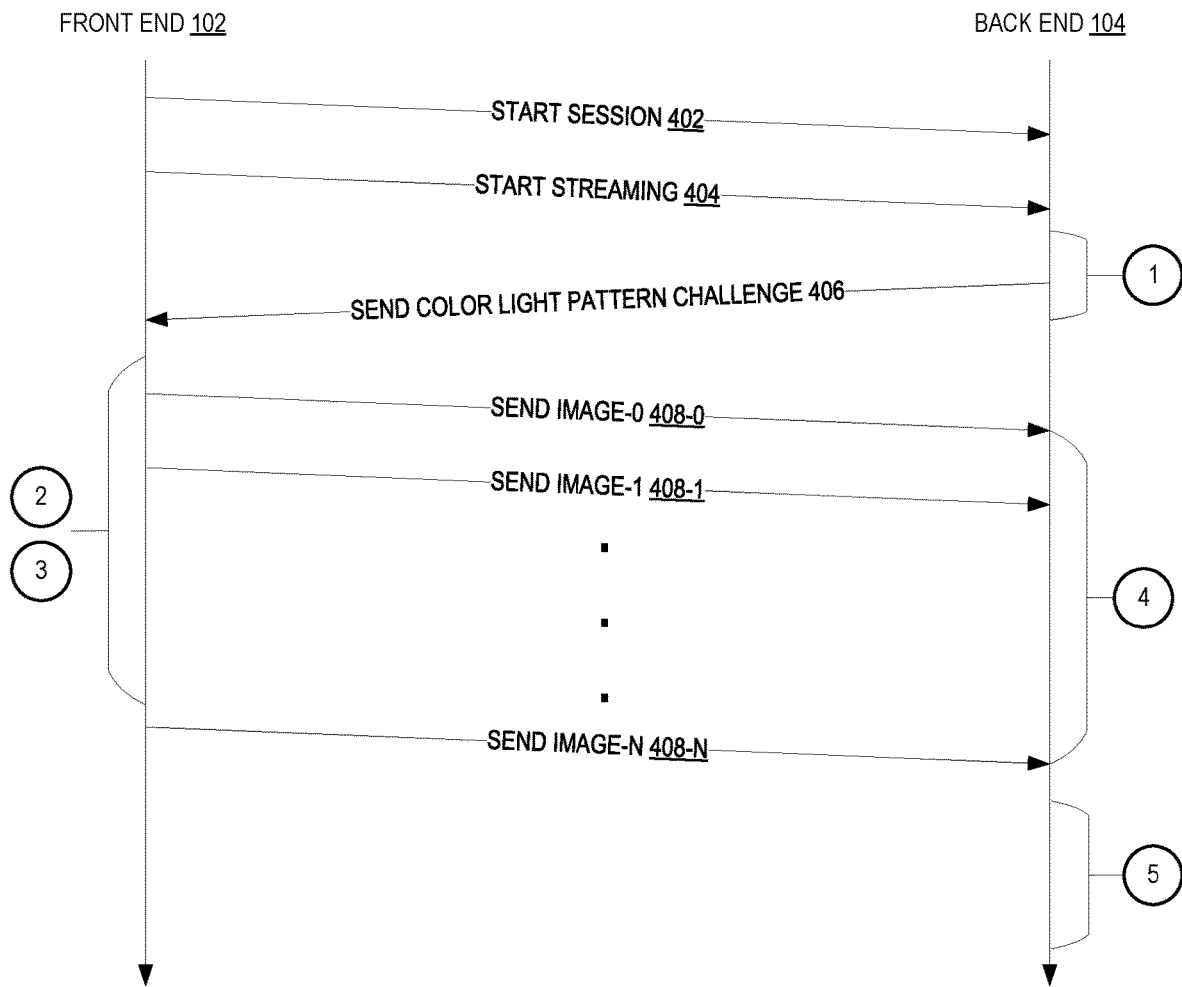
FIG. 4 illustrates a first possible interaction between a front end and a back end of a face authentication computer system in which a liveness detection service is programmed or configured to perform liveness detection using display screen light reflections, according to some examples.

FIG. 4 illustrates a possible interaction between front end 102 and back end 104 for a color light pattern challenge and with reference to Steps of FIG. 2, according to some examples. Front end 102 starts 402 a face authentication session with back end 104. After the start of the session, camera 114 can be activated at front end 102 and can begin capturing images. The captured images can be streamed 404 from front end 102 to back end 104. Meanwhile, in response to start 402 of the face authentication session, back end 104 can generate a color light pattern challenge in Step 1. Back end 104 can send 406 information to front end 102 about the color light pattern challenge such as the color elements selected for inclusion in the challenge and the presentation order of the selected color elements. While the color light pattern challenge is presented on screen 112 in Step 2, user 108 can respond to the challenge in Step 3 and front end 102 can send 408 a set of target images captured by camera 114 to back end 104 in Step 4. After the set of target images are received, back end 104 can conduct a liveness analysis of the set of target images in Step 5.

As an alternative, the information about the color light pattern challenge can be streamed from back end 104 to front end 102 in Step 1 of FIG. 2 while target images are streamed from front end 102 to back end 104 in Step 4 of FIG. 2. Furthermore, the liveness analysis can be conducted in Step 5 as target images are received at back end 104 from front end 102. This bidirectional operation allows back end 104 to stop the face authentication process as soon as the liveness analysis at Step 5 of FIG. 2 determines that user 108 is not genuine which can be before presentation of the entire color light pattern challenge in Step 2.

Figure 5:
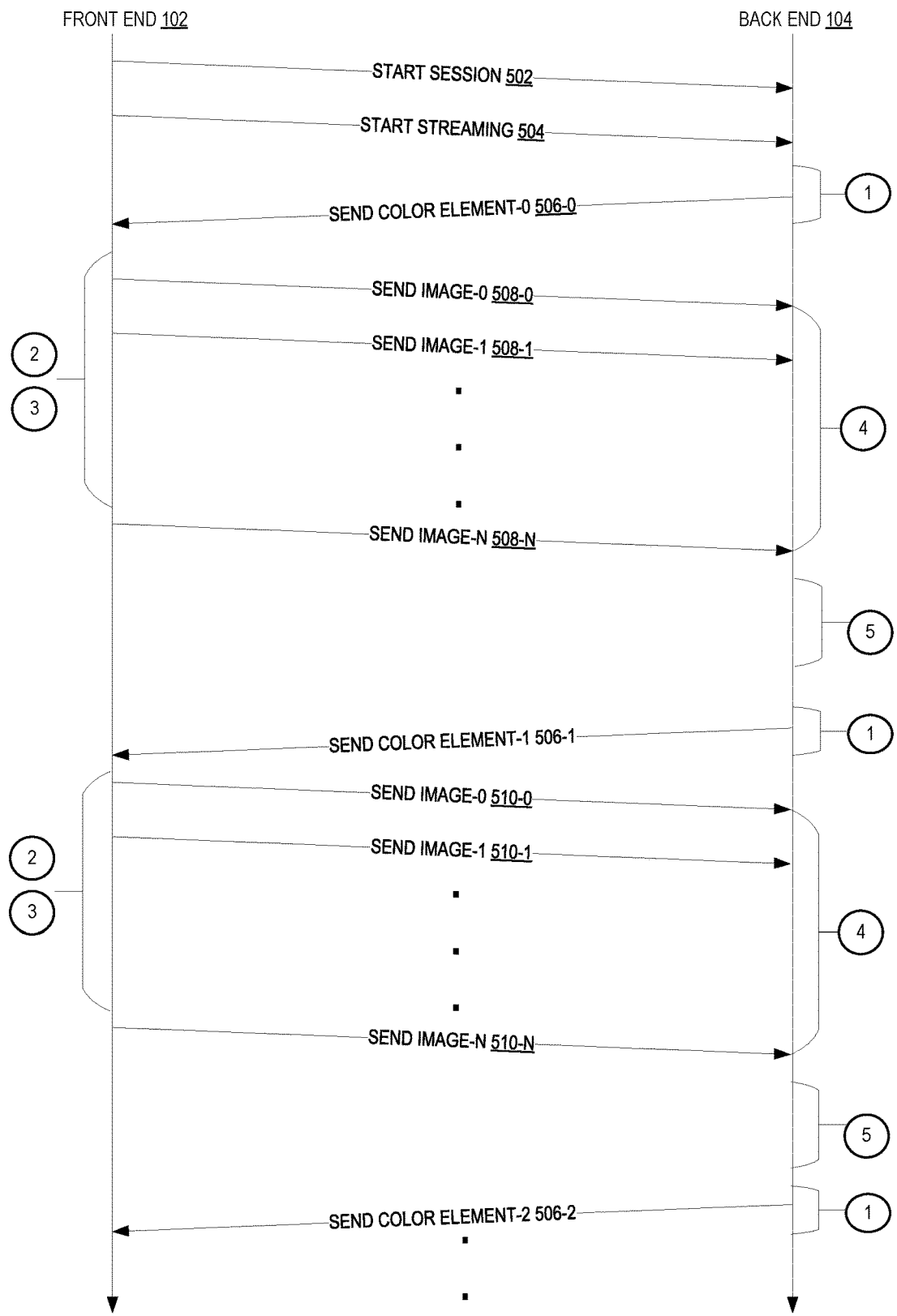
FIG. 5 illustrates a second possible interaction between a front end and a back end of a face authentication computer system in which a liveness detection service is programmed or configured to perform liveness detection using display screen light reflections, according to some examples.

FIG. 5 is an interaction diagram depicting a possible interaction between front end 102 and back end 102 for a color light pattern challenge and with reference to Steps of FIG. 2. Front end 102 starts 502 a face authentication session with back end 104. After the start the session, camera 114 can be activated at front end 102 and begin capturing images of user 108. The captured images can be streamed 504 from front end 102 to back end 104. Meanwhile, in response to start 502 of session, back end 102 can generate and send 506-0 a first color element selected for inclusion in the color light pattern challenge to front end 102 in Step 1.

While the first color element is presented on screen 112 in Step 2, user 108 can respond to the challenge in Step 3 and front end 102 can send 508 a set of target images captured by camera 114 to back end 104 in Step 4. After the set of target images for the first color element is received, back end 104 can conduct a liveness analysis of the set of target images sent 508 in response to presentation of the first color element in Step 5. If back end 104 determines that user 108 is genuine based on analysis of the set of target images sent 508 for the first color element, then back end 104 can send 506-1 a second color element selected for inclusion in the color light pattern challenge to front end 102 in Step 1.

While the second color element is presented on screen in Step 2, user 108 can respond to the challenge in Step 3 and front end 102 can send 510 a set of target images captured by camera 114 to back end 104 in Step 4. After the set of target images for the second color element are received at back end 104, back end 104 can conduct a liveness analysis of the set of target images sent 510 in response to presentation of the second color element at front end 102 in Step 5. If back end 104 determines that user 108 is still genuine based on analysis of the set of target images sent 510 for the second color element, then back end 104 can send 506-2 a second third element selected for inclusion in the color light pattern challenge to front end 102 in Step 1. This may repeat for additional color elements selected for inclusion in the color light pattern challenge.

With the bidirectional operation, a liveness analysis can be conducted at back end 104 after the presentation of each color element of the color light pattern challenge at front end 102 based on the set of target images that have been received for the color light pattern challenge so far by back end 104. Back end 104 can stop and reject the face authentication process in Step 7 if back end 104 determines that user 108 is not genuine based on the set of target images received so far. This just-in-time stoppage can conserve computing resources of back end 104 by avoiding performance of an unnecessary liveness analysis based on target images when it has already determined by back end 104 that user 108 is not genuine based on the color elements presented and the target images received and analyzed so far.

While in some examples of bidirectional operation color elements of the color light pattern challenge can be sent separately from liveness detection service 116 to device 110 such as depicted in FIG. 5, all color elements of the color light pattern challenge are sent at the start of the face authentication session from liveness detection service 116 to device 110 before presentation of the color light pattern challenge at device 110 begins in other examples. In this case, liveness detection service 116 can still conduct a liveness analysis on received images as the images are received at liveness detection service 116 and liveness detection service 116 can still stop the face authentication process as soon it is determined that user 108 is not genuine.

In addition, the bidirectional operation also facilitates timing verification by back end 104. Timing verification can be useful to detect injection or deepfake attacks. In the absence of an attack, back end 104 should receive a target image reflecting a next color element from front end 102 soon after information about the next color element of the color light pattern challenge to display is sent from back end 104 to front end 102. In the absence of an attack, the time delay between (1) the time when back end 104 sends information about the next color element to front end 102 and (2) the time thereafter when a target image reflecting the next color element is received at back end 104 should be mostly affected by the delay of the network (e.g., 106) connecting front end 102 and back end 102. However, in the event of an injection or deepfake attack, some additional delay may be incurred at front end 102 generating an injected image or a deepfake image that reflects the next color element.

In some examples, the inter-arrival times of target images streamed from front end 102 at back end 104 are determined by back end 104. The inter-arrival times are analyzed by back end 104 to identify any anomalous inter-arrival times that are indicative of a delay at front end 102 caused by generating an injected image or a deepfake image. In some examples, back end 104 determines the inter-arrival time between consecutive target images received at back end 104 to determine if the inter-arrival time is anomalous compared to a baseline inter-arrival time. For example, the baseline inter-arrival time can be empirically determined or can be a mean inter-arrival time or other summary statistic of baseline inter-arrival times.

In any case, the baseline inter-arrival time can reflect a network delay of intermediate network 106 between sending a target image from front end 102 and receiving the target image at back end 104. When a target image is received at back end 104 for the color light pattern challenge, back end 104 can determine an arrival time of the target image and compute the difference from the arrival time at back end 104 of a previous target image received at back end 104 for the color light pattern challenge. If the difference is significantly greater (e.g., more than two standard deviations greater) than the baseline inter-arrival time, then back end 104 can determine that an injection attack or deepfake attack is underway. In this case, back end 104 can stop the face authentication process and inform front end 102 that the face authentication process failed in Step 7.

Returning now to FIG. 2, at Step 5, a set of target images can be processed by liveness detection service 116 to detect the liveness of a detected/tracked face in the set of target images. At a high-level, this processing can include detecting or tracking the face in the set of target images by face detector/tracker 204; extracting 206 color, luminance, or luminance gradient features from pixels on the detected/tracked face in the set of target images; and making 208 a liveness determination as to whether the detected/tracked face is genuine or not based on analysis of the extracted features.

In some examples, the liveness determination is made by module 208 in the form of a liveness score which numerically represents the confidence or probability that the detected/tracked face is genuine or not based on analysis of the extracted features. For example, the liveness score can be numerical data that represents a real number between 0 and 1 where 1 represents the greatest confidence or 100% probability that the detected/tracked face is genuine and 0 represents the lowest confidence or 0% probability that the detected/tracked face is genuine and values in between 0 and 1 represent a degree of confidence or probability that the detected/tracked face is genuine.

If the detected/tracked face is determined 208 by liveness detection service 116 to be genuine (e.g., because the liveness score is 1 or is above a threshold between 0 and 1), then, at Step 6, the set of target images or data based thereon can be forwarded to face recognition service 118 to determine the identity of the detected/tracked face. On the other hand, if the detected/tracked face is determined 208 by liveness detection service 116 to not be genuine (e.g., because the liveness score is 0 or below a threshold between 0 and 1), then, at Step 7, data can be sent to device 110 indicating that the face authentication process failed.

Face detector/tracker 204 can be programmed or configured to detect or track a face in the set of target images. Here, detection can encompass determining the location of a detected face in a target image and tracking can encompass determining the location of a tracked face in each of a set of target images. A location of a detected/tracked face in a target image can be identified by coordinates of a bounding box around the detected/tracked face in the target image.

Face detector/tracker 204 can be programmed or configured to detect or track a face in the set of one or more target images using a variety of different computer vision techniques including techniques that employ a deep neural network trained for face detection or face tracking. No particular face detection or tracking technique is required. In some examples, if multiple faces are detected in the same target image, then liveness detection service 116 can stop the face authentication process as only one genuine user should be attempting to authenticate.

Face detector/tracker 204 can also be programmed or configured to perform face landmark identification on the target face detected or tracked in the set of target images. Face landmark identification can encompass identifying locations (sometimes called "face landmarks" or just "landmarks") in a target image containing a detected/tracked face that exist on virtually every human face such as the top of the chin, the outside edge of each eye, the inner edge of each eyebrow, etc.

In some examples, face landmark identification is performed following face detection or tracking. Alternatively, face landmark identification and face detection or tracking can be performed simultaneously. For example, a set of one or more deep neural networks may be jointly trained to perform both face detection or tracking and face landmark detection on an input set of target images.

The output of face detector/tracker 204 may include bounding boxes for target images in the set of target images in which the target face is detected or tracked. Each bounding box may enclose the target face in a respective target image. The output for each such target image may also include a set of image coordinates (x, y coordinates) corresponding to identified face landmarks on the target face as depicted in the target image.

While in some examples face detection, face tracking, and face landmark identification is performed by liveness detection service 116, any or all of face detection, face tracking, or face landmark identification can be performed at device 110 to distribute compute workload over font end 102 and back end 104. In this case, device 110 can be programmed or configured with a set of one or more pre-trained machine learning models (e.g., a pre-trained deep neural network model). For example, device 110 can download the pre-trained models and software to execute the models from provider network 100. Device 110 can be programmed or configured to use the set of pre-trained machine learning models at device 110 to perform face detection, face tracking, or face landmark identification at device 110 based on a set of target images obtained at device 110. In this case, device 110 can send determined face bounding box information or face landmark identification information for a detected/tracked face to liveness detection service 116 at Step 4 along with the set of target images. The received bounding box information and face landmark identification information can be provided to face-reflected light feature extractor 206 without face detector/tracker 204 of liveness detection service 116 repeating face detection, face tracking, or face landmark identification operations that were already performed at device 110 as reflected by the resulting bounding box information or face landmark identification information provided by device 110 to liveness detection service 116 in Step 4.

A purpose of performing face landmark identification on a detected/tracked face in a target image can be to locate an area of the target image where the light from screen 112 should be adequately reflected off the face of user 108. Face-reflected light information for purposes of comparing with color, luminance, or luminance gradient information about the color light pattern displayed on screen 112 can be extracted from the pixels corresponding to located area of the face. Certain parts of the face such as the eyes or mouth might not adequately reflect the light from screen 112 because of movement such as blinking of the eyes or talking or occlusions such as caused by eyeglasses, mustaches, beards, etc.

In some examples, the bridge of the nose or the forehead above the eyebrows can be identified by face detector/tracker 204 based on face landmark identification. Face-reflected light information can be extracted one or both areas. For example, face detector/tracker 204 can be programmed or configured to apply a face detection/tracking algorithm to detect/track a face in the set of target images. For a target image in which a face is detected/tracked, face detector/tracker 204 can be programmed or configured to apply a face landmark identification algorithm to identify a set of one or more coordinates in the target image corresponding to the bridge of the nose or other landmark on the detected/tracked face. Face detector/tracker 204 can be programmed or configured to identify a set of one or more pixels corresponding to or based on the set of coordinates in the target image. For example, the set of one or more pixels can be a rectangular area of the target image bounding the bridge of the nose or other facial landmark area.

Feature extractor 206 can be programmed or configured to extract luminance information from the identified facial landmark area. In some examples, a luminance value is computed for a pixel in the area. The luminance value for the pixel can also be referred to in certain contexts as the luma of the pixel, the brightness of the pixel, or the lightness of the pixel. The luminance value for the pixel can be computed according to various luminance model functions capable of converting red, green, and blue color channel values of the pixel to a luma, intensity, brightness, or lightness value for the pixel according to a target luminance model. For example, the luminance model could be any of: a Hue, Saturation, and Value (HSV) color model where the Value (V) can be used as the luminance value; a Hue, Saturation, and Intensity (HSI) color model where the Intensity (I) can be used as the luminance value; a Hue, Saturation, and Lightness (HSL) color model where the Lightness (L) is used as the luminance value; or a perceptual lightness model in which a luma value computed as a weighted sum red, green, and blue color channel values is used as the luminance value and in which the weights can be selected based on a model of how humans perceive luminance.

Multiple luminance values can be computed for multiple pixels in the facial landmark area. In this case, a final, aggregated luminance value representing the face-reflected light can be computed as a mean, average, or other suitable statistical combination of the multiple individual luminance values.

Figure 6:
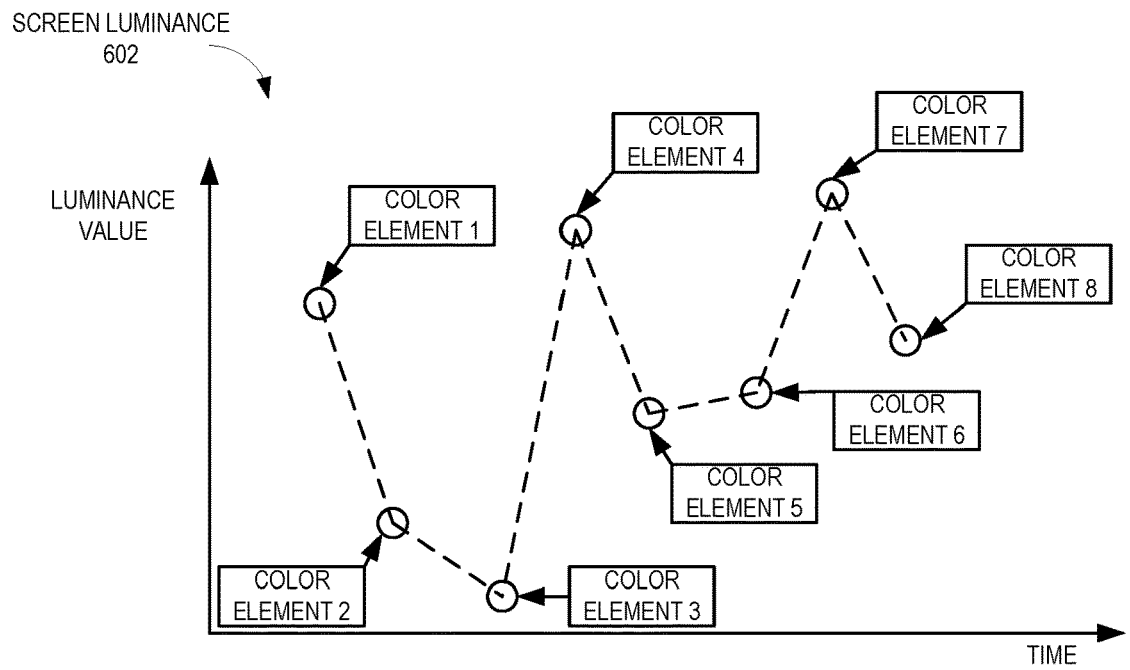
FIG. 6 illustrates display screen light luminance and face-reflected light luminance, according to some examples.
Figure 6:
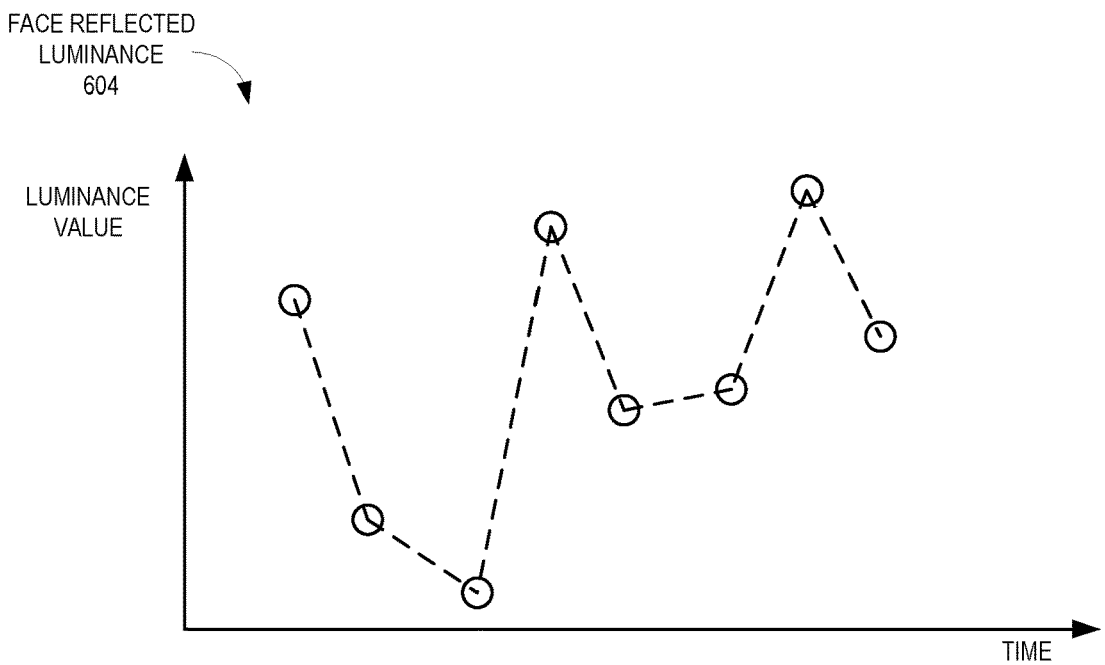

FIG. 6 illustrates screen luminance 602 of screen 112 over a time during which a color light pattern challenge is displayed on screen 112 and illustrates face-reflected luminance 604 of light reflected off the genuine face of user 108 over the same time as captured by camera 114 in a set of target images. In this example, eight color elements are presented in the color light pattern and wipe transitions are used. The luminance of screen 112 decreases over time as a wipe transition is made from a higher luminance color to a lower luminance color and the luminance of screen 112 increases over time as a wipe transition is made from a lower luminance color to a higher luminance color. As shown, the luminance changes for screen luminance 602 and face reflected luminance 604 correspond when user 108 is genuine. Specifically, for each luminance change on screen 112, there is a corresponding luminance change in the face-reflected light in the target images.

When user 108 is a genuine user and not an attacking user, the number of significant luminance changes of the face-reflected light in the set of target images should be equal to the number of significant luminance changes in the color light pattern challenge that is displayed on screen 112. A significant luminance change corresponds to a difference in the screen luminance or the face-reflected luminance between two consecutive color elements in the color pattern sequence. For example, a significant luminance change can occur when a first color element is the sequence is displayed on screen 112 and then the next color element in the sequence is displayed on screen 112. In the example of FIG. 6, there are seven significant luminance changes in screen luminance 602.

In some examples, liveness detection service 116 can be programmed or configured to determine the number of significant luminance changes in the face-reflected light in the set of target images and the number of significant luminance changes in the color light pattern challenge that is displayed on screen 112. Liveness detection service 116 may be further programmed or configured to determine, at operation 208, if the numbers of significant luminance changes are equal. If not equal, then liveness detection service 116 can determine that user 108 is not a genuine user (e.g., is an attacking user) or lower the liveness score for user 108. In some examples, equality between the numbers of significant luminance changes is required for liveness detection service 116 to determine that user 108 is a genuine user.

In some examples, a tolerance is allowed. For example, in some examples, liveness detection service 116 can determine that user 108 is a genuine user if the numbers of significant luminance changes are within one, two, or a few of each other. Whether and the extent of a tolerance is permitted depends on a tradeoff between potentially increasing false negative liveness determinations with a higher tolerance and potentially increasing false positive liveness determinations with no or a low tolerance.

In some examples, in addition to determining if the number of significant luminance changes correspond, liveness detection service 116 can be programmed or configured to determine if the luminance gradients between the significant luminance changes correspond. In some examples, a luminance gradient is either decreasing in luminance or increasing in luminance. For example, in the example of FIG. 6, the luminance gradients in order of the seven significant luminance changes over time are as follows: (1) decreasing, (2) decreasing, (3) increasing, (4) decreasing, (5) increasing, (6) increasing, and (7) decreasing. In the example of FIG. 6, the luminance gradients between screen luminance 602 and face reflected luminance 604 match.

There can be other ways used by liveness detection service 116 to determine correspondence between a screen luminance pattern (e.g., 602) and a face reflected luminance pattern (e.g., 604). For example, a Pearson correlation coefficient may be computed between screen luminance pattern 602 and face reflected luminance pattern 604. For example, the variables in the coefficient calculation can be a series of luminance values for each of screen luminance 602 and face reflected luminance 604. In this case, liveness detection service 116 can be programmed or configured to determine that user 108 is not an attacking user if the Pearson correlation coefficient is one or close to one (e.g., greater than 0.8).

In some examples, a trained multi-class machine learning classifier is used to determine whether the colors of the face-reflected light in the set of target images correspond to the colors of the color light pattern challenge. The multiple classes can correspond to different possible colors that can be selected for inclusion in the color light pattern challenge. A set of one or more luminance values for face-reflected light in a target image or other face-reflected light features can be input to the classifier. The output of the classifier can be a color of the face-reflected light in the target image inferred by the trained classifier. This classification can be done for multiple target images ordered by time to produce a sequence of face-reflected light colors also ordered by time. If user 108 is genuine, then the order of colors in the sequence should correspond to the order of the colors presented in the color light pattern challenge. For example, if the presentation order of the colors in the color light pattern challenge is red, black, yellow, black, orange, then a sequence of colors output by the classifier should also be red, black, yellow, back, and orange. If the color orders do not match, then liveness detection service 116 can determine 208 that user 108 is not a genuine user.

Liveness detection service 116 can be programmed or configured to compute statistics for comparison from a set of receipt times for a set of pre-challenge target images and a set of receipt times for a set of challenge response target images. To prevent spoofing of the receipt times by the attacking user, back end 104 can determine the receipt times of target images according to a clock or counter at back end 104 that the attacking user does not have access to and cannot manipulate. A receipt time for a target image can correspond to a time when the video frame is received at back end 104. The statistic for comparison could be a standard deviation or a cumulative distribution function of the intervals between the set of receipt times or other suitable statistic that is based on the receipt intervals. In this case, liveness detection service 116 can be programmed or configured to determine that user 108 is an attacking user if there is a significant difference between the statistics computed for sets of target images, particularly where the statistics indicate that the receipt intervals for the pre-challenge target images are significantly shorter than the receipt intervals for the challenge response target images. The increased receipt intervals for the challenge-response target images can be due to the extra processing time incurred at front end 102 by attempting to generate injected target images or deepfake target images in real-time.

Liveness Detection Based on Gesture Validation

Liveness detection service 116 can be programmed or configured to use a gesture validation model to counter presentation attacks. In some examples, liveness detection service 116 can be programmed or configured to extract trajectory information about a detected/tracked face in the set of target images and determine liveness based on the trajectory information. The trajectory information can be extracted from the set of target images using a gesture validation model. The gesture validation model can be based on dense optical flow estimation, convolutional neural networks, or transformers.

Figure 7:
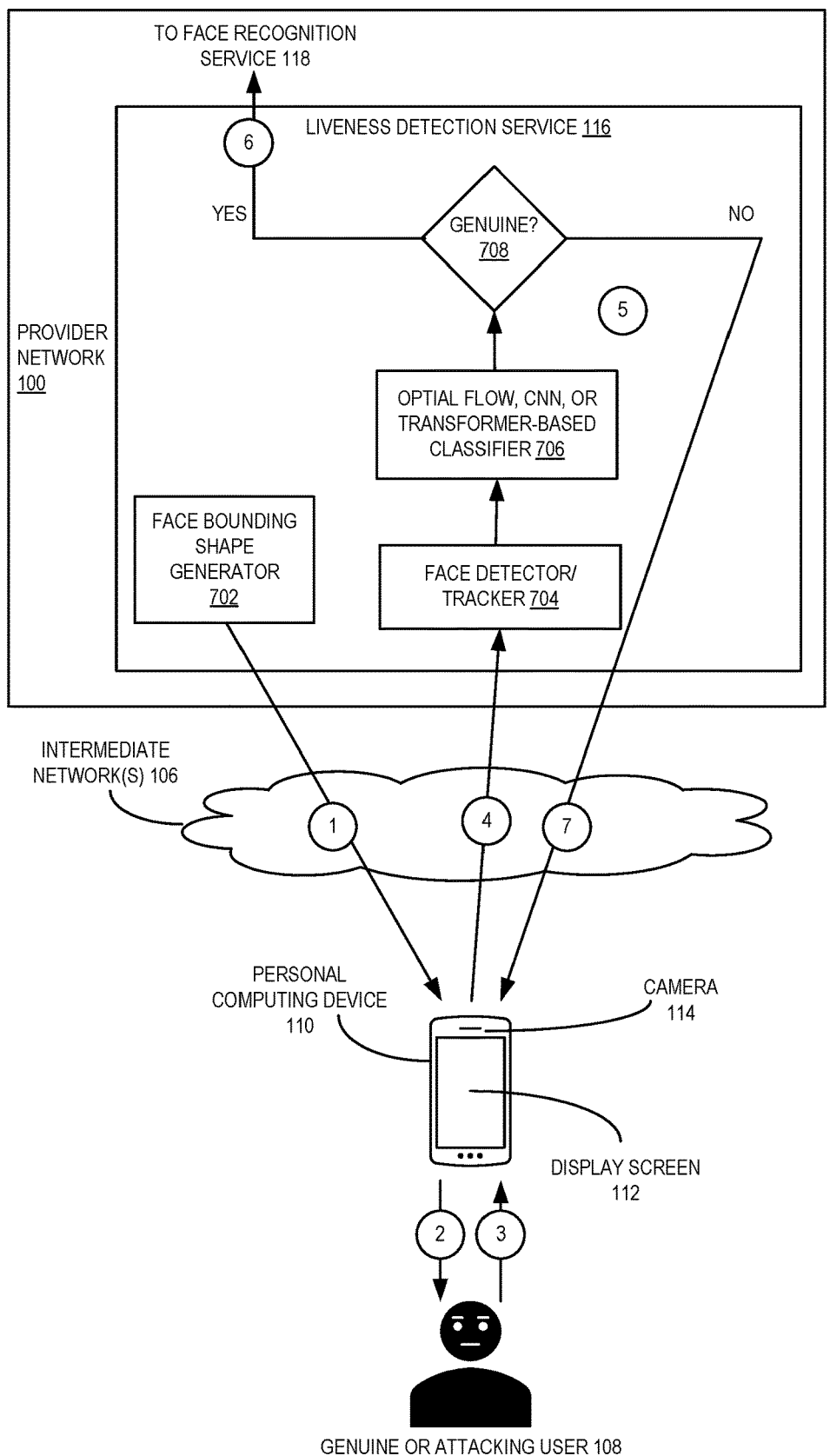
FIG. 7 depicts a face authentication computer system in which a liveness detection service is programmed or configured to perform liveness detection using a gesture validation model, according to some examples.

FIG. 7 depicts the face authentication computer system of FIG. 1 and in which liveness detection service 116 is programmed or configured to perform liveness detection using a gesture validation model, according to some examples. Using a gesture validation model for liveness detection is described below in the context of the face authentication process described above with respect to FIG. 1. Like FIG. 1, steps of the face authentication process that uses a gesture validation-based model for liveness detection are depicted in FIG. 7 as numbered circles. Directional arrows represent a direction of data flow between connected components but not necessarily the exclusive direction. Data represented by directed arrows in FIG. 7 that flows between depicted components can traverse one or more intermediate components (e.g., an intermediate network or computing device). Such an intermediate component may not be depicted in FIG. 7 for the purpose of providing a clear example.

In some examples, liveness detection can be performed by liveness detection service 116 based on face or head movements. At Step 1, face bounding shape generator 702 is programmed or configured to generate a face bounding shape pattern to display on screen 112. The face bounding shape pattern can include a sequence of one or more face bounding shapes to display on screen 112.

In some examples, the face bounding shape is an oval but can be another shape such as a circle, square, or rectangle. The bounding shape used can vary depending on the dimensions of screen 112. For example, where screen 112 is rectangular such as is common with consumer smartphones, the bounding shape can be an oval or a rectangle with the longer axis of the oval or rectangle parallel with the longer axis of screen 112. However, any of an oval, rectangle, square, or circle of various dimensions can be used.

At Step 2, as a challenge, user 108 is requested to position their face such that it fits just inside the displayed face bounding shape. A series of face bounding shapes can be displayed one after the other and of different dimensions to cause user 108 at Step 3 to move their face toward or away from camera 114 or cause user 108 to move device 110 or camera 114 closer to or farther away from their face to fit their face just within the face bounding shape currently displayed on screen 112. By doing so, motion can be captured in a set of target images sent from front end 102 to back end 104 at Step 4. The motion in the set of target images can be analyzed by liveness detection service 116 at Step 5 according to a gesture validation model to determine the liveness of user 108. The set of target images or data derived therefrom can be forwarded to face recognition service 118 at Step 6 if it is determined that user 108 is genuine. If it is determined that user 108 is not genuine, then data indicating that the face authentication process failed can be returned to front end 102 at Step 7.

To verify the liveness of user 108 using the gesture validation model, the set of target images captured by camera 114 can capture motion of the face of user 108. To induce the motion, face bounding shape generator 702 can generate a face bounding shape pattern to be displayed to user 108 on screen 112. The face bounding shape pattern can include a set of one or more face bounding shapes. Each face bounding shape can be displayed on screen 112 until user 108 has fit their face just within the face bounding shape or until a timer has elapsed (e.g., a ten, twenty, or thirty second timer). Meanwhile, target images captured by camera 114 can be streamed from front end 102 to back end 104 as user 108 is moving their face to fit within the face bounding shape thereby capturing motion in the set of target images. The motion of a detected/tracked face in the set of target images can be analyzed for liveness. If the timer expires before user 108 has fit their face within a currently displayed face bounding shape, then the face authentication process can be stopped.

Face detector/tracker 704 can be programmed or configured like face detector/tracker 204 of FIG. 2 to detect a face in a target image, to track a face in target images of the set of target images, or to identify face landmarks on a detected/tracked face in a target image. Like with liveness detection based on display screen light reflections, face detection, face tracking, or face landmark identification operations can be performed for liveness detection based on a motion-based model at device 110 instead of by face detector/tracker 704 of liveness detection service 116. Thus, while FIG. 7 depicts face detector/tracker 704 as a component or module of liveness detection service 116, face detector/tracker 704 can instead be a component or module of device 110.

Based on the location of the facial landmarks in the target images, face detector/tracker 704 can be programmed or configured to determine when user 108 has fit their face within the dimensions of the currently displayed face bounding shape. For example, face detector/tracker 704 at device 110 or at liveness detection service 116 can be programmed or configured to use one or more machine learning models to estimate a face pose of a detected/tracked face in a set of target images and detect when the detected/tracked face is fit within the currently displayed face bounding shape. Face detector/tracker 704 can be programmed or configured to signal face bounding shape generator 702 or device 110 to trigger display of a next face bounding shape screen 112 (if there is one) after user 108 has successfully fit their face within the currently displayed face bounding shape.

In some examples, only a single face bounding shape is displayed during a face bounding shape challenge. The size of the face bounding shape can be selected based on assuming that the face of user 108 at the start of the face bounding shape challenge is at a normal comfortable viewing distance from screen 112 such as between forty and eighty centimeters (~sixteen to thirty-two inches) and assuming camera 114 is positioned at the same or approximately the same distance from the face of user 108 as screen 112. This is typically the case when camera 114 is a smartphone camera or a laptop camera or a camera integrated with or fastened to a desktop monitor. At the normal distance it can be easier for user 108 to move their face toward screen 112 and camera 114 than it can be for user 108 to move their face away from screen 112 and camera 114. For example, if user 108 is sitting in a chair using a laptop or desktop computer, then user 108 can lean forward to bring their face closer to screen 112 and camera 114. If user 108 is using a handheld computing device such as a smartphone, then user 108 can bring screen 112 and camera 114 of the handheld device closer to their face with a flexion of the elbow. Accordingly, the dimensions of the face bounding shape can be selected so that user 108 is induced to bring their face closer to screen 112 and camera 114 relative to the normal distance. At the same time, the dimensions of the face bounding shape can be selected so that the user 108 is not required to bring their face uncomfortably close to screen 112.

Figure 8:
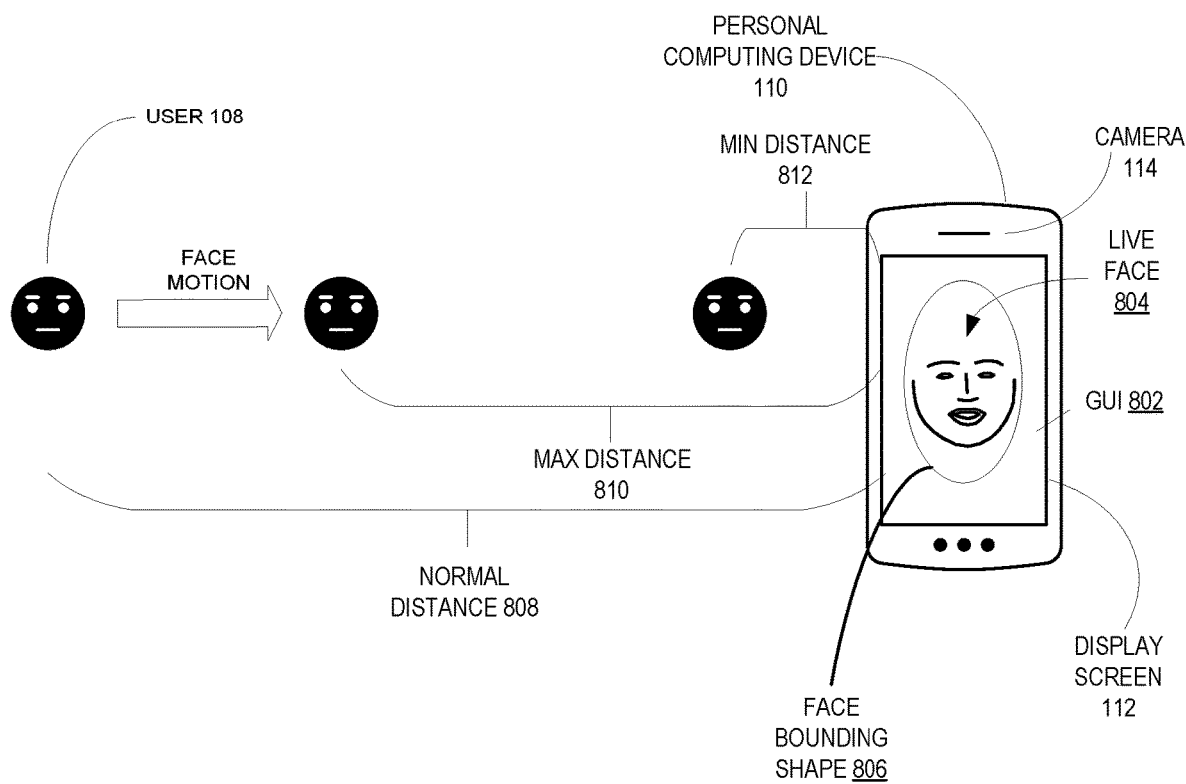
FIG. 8 illustrates a face bounding shape challenge to induce face motion, according to some examples.

FIG. 8 illustrates sizing a face bounding shape, according to some examples. User 108 uses personal computing device 110 with screen 112 and camera 114. GUI 802 is presented on screen 112 and displays live face 804 of user 108 in real time as captured by camera 114. The face of user 108 is assumed to initially be at normal distance 808 from screen 112 and camera 114. Face bounding shape 806 is sized in GUI 802 such that user 108 is induced to move their face from normal distance 808 to between maximum distance 810 and minimum distance 812 from screen 112 and camera 114.

In some examples, as user 108 moves their face from normal distance 808 to between maximum distance 810 and minimum distance 812, a set of target images are captured by camera 114. This set of target images captures motion of the face of user 108 that can be analyzed for liveness using the gesture validation model.

In some examples, once user 108 has fit their face within face bounding shape 806, a color light pattern challenge is displayed on screen 112 and an additional set of target images is captured by camera 114 that can be analyzed for liveness using a face light reflection model as described herein. Thus, the sizing of a face bounding shape can achieve both (1) the objective of causing user 108 to move their face and thereby provide motion that can be captured by camera 114 in the set of target images for gesture validation model analysis and (2) the objective of having the face of user 108 comfortably close enough to screen 112 and camera 114 so that light emitted from screen 112 during presentation of the color light pattern challenge on screen 112 is adequately reflected off the face of user 108 accounting for different human skin colors and different environment lighting conditions. In an alternative, the color light pattern can be displayed on screen 112 while user 108 is moving their face to fit within face bounding shape 806 as opposed to waiting until user 108 has fit their face within face bounding shape 806 to begin displaying the color light pattern on screen 112. This way there can be less inconvenience to user 108 as user 108 is required to spend less time responding to the face oval and display screen light reflection challenges.

In some examples, face detector/tracker 704 at device 110 can be programmed or configured to estimate an initial distance of the face of user 108 from screen 112 and camera 114 even if camera 114 is not a stereo camera and is not configured with a hardware depth sensor. In particular, face detector/tracker 704 can be programmed or configured to analyze a set of pre-challenge target images and estimate an initial distance of a detected/tracked face in the set of pre-challenge target images. For example, the analysis can be based on a triangular similarity algorithm or other suitable algorithm that can be used to estimate a distance of an object from camera 114 as captured in an image by camera 114 without requiring camera 114 to be a stereo camera and without requiring a depth sensor (e.g., an infrared sensor).

As an example of an alternative suitable algorithm for estimating the initial distance, the initial distance can be estimated by detecting or tracking a face in a target image and then determining the area of the target image covered by the detected or tracked face. The larger the area covered, the closer the distance to camera 114. The smaller the area covered, the farther away the distance to camera 114. The initial distance can be estimated based on how much of the area of the target image is occupied by the detected/tracked face.

If the estimated initial distance is greater than maximum distance 810, then a single face bounding shape can be used that is sized to induce user 108 to move their face toward screen 112 and camera 114 so that the distance of the face of user 108 from screen 112 and camera 114 is between maximum distance 810 and minimum distance 812. However, if the initial distance is between maximum distance 810 and minimum distance 812, then two face bounding shapes of different sizes can be used. A first face bounding shape can be used to cause user 108 to move their face away from screen 112 and camera 114 so that the distance of the face of user 108 (e.g., as measured according to a triangular similarity algorithm or other suitable algorithm) is greater than maximum distance 810. Once the face of user 108 is at a distance greater than maximum distance 810, then a second face bounding shape can be displayed on screen 112 that is designed to induce user 108 to move their face closer to screen 112 and camera 114. A set of target images can be captured by camera 114 as user 108 moves their face toward screen 112 and camera 114 starting from distance from screen 112 and camera 114 that is greater than maximum distance 810. As indicated, once user 108 has positioned their face at a distance between maximum distance 810 and minimum distance 812, an instruction can be displayed on screen 112 requesting user 108 to hold still (e.g., stop moving toward screen 112 and camera 114). Once at this hold distance, a color light pattern challenge can be presented on screen 112.

As indicated, the face bounding shapes in a series of face bounding shapes displayed on screen 112 can have different sizes on screen 112 to induce motion of the face by user 108 relative to screen 112 and camera 114.

Figure 9:
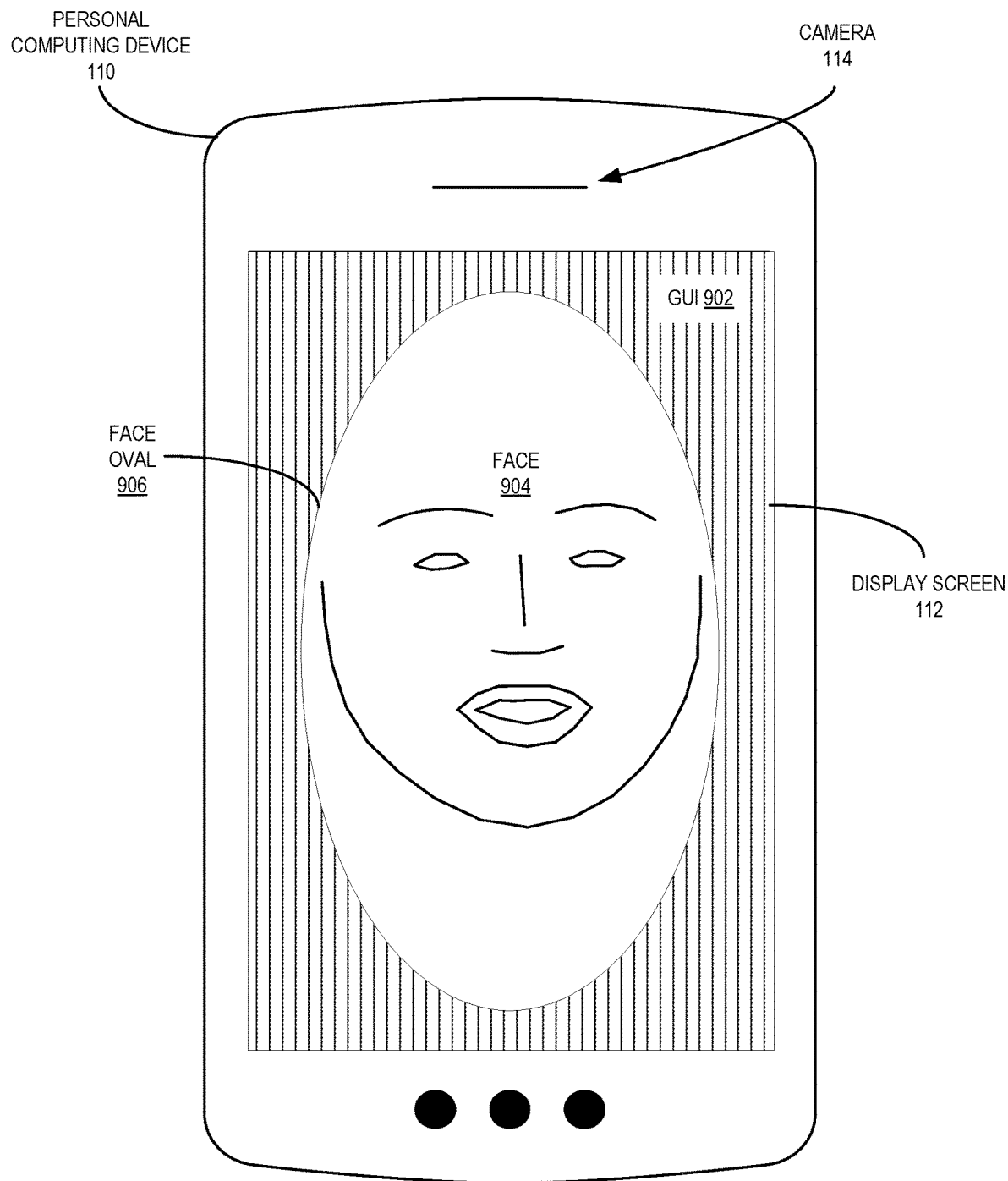
FIG. 9, FIG. 10, and FIG. 11 illustrate a sequence of face oval challenges, according to some examples.

FIG. 9 illustrates first face oval 906 in a series of face bounding shapes displayed on screen 112, according to some examples. Face oval 906 can be displayed as part of GUI 902 on display screen 112 of device 110. Face 904 of user 108 as captured by camera 114 can also be displayed on screen 112 to guide user 108. User 108 can be prompted (not shown) in GUI 902 to move their face 904 closer to camera 114 or farther away from camera 114 until their face 904 fits tightly in face oval 906. As user 108 is responding to the face oval challenge, target images can be streamed from device 110 to liveness detection service 116. Face detector/tracker 704 can analyze the streamed target images to determine when user 108 has positioned their face 904 tightly within face oval 906. For example, face detector/tracker 704 can employ face pose estimation techniques possibly involving the use of one or more trained machine learning models, a triangular similarity algorithm, or other suitable algorithm to determine when user 108 has positioned their face 904 tightly within face oval 906 (e.g., when face 904 is at a distance from screen 112 and camera 114 where face 904 would fit tightly within face oval 906). As mentioned, target images captured by camera 114 can be streamed to liveness detection service 116 for analysis by face detector/tracker 704 there. Alternatively, target images can be analyzed by face detector/tracker 704 at device 110 and the results of the analysis sent to liveness detection service as needed.

Figure 10:
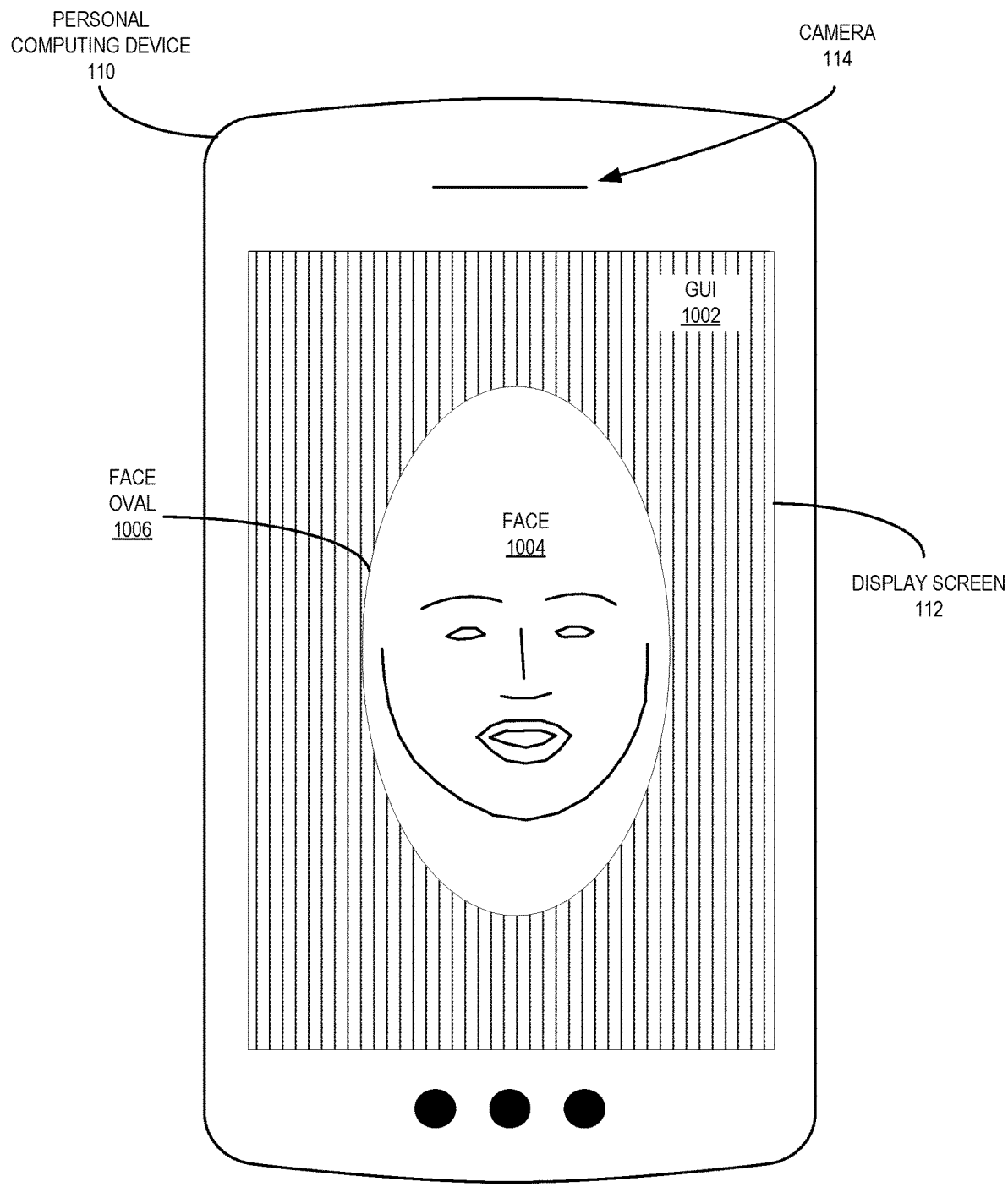

FIG. 10 illustrates second face oval 1006 in the series that can be displayed on screen 112 after user 108 has successfully fit their face 904 tightly in first face oval 906, according to some examples. Second face oval 1006 has a smaller interior area on screen 112 than first face oval 906. As a result, user 108 can move their face farther away from camera 114 relative to the position of face 904 when it tightly fit in first face oval 906 such as, for example, by extending their arm while holding device 110 and facing screen 112 and camera 114. The target images captured by camera 114 that capture the motion of the face away from screen 112 and camera 114 as the face is moved from fitting tightly within first face oval 906 to fitting tightly within second face oval 1006 can be sent to liveness detection service 116 from front end 102 to back end 104 for liveness analysis there or analyzed at device 110.

Figure 11:
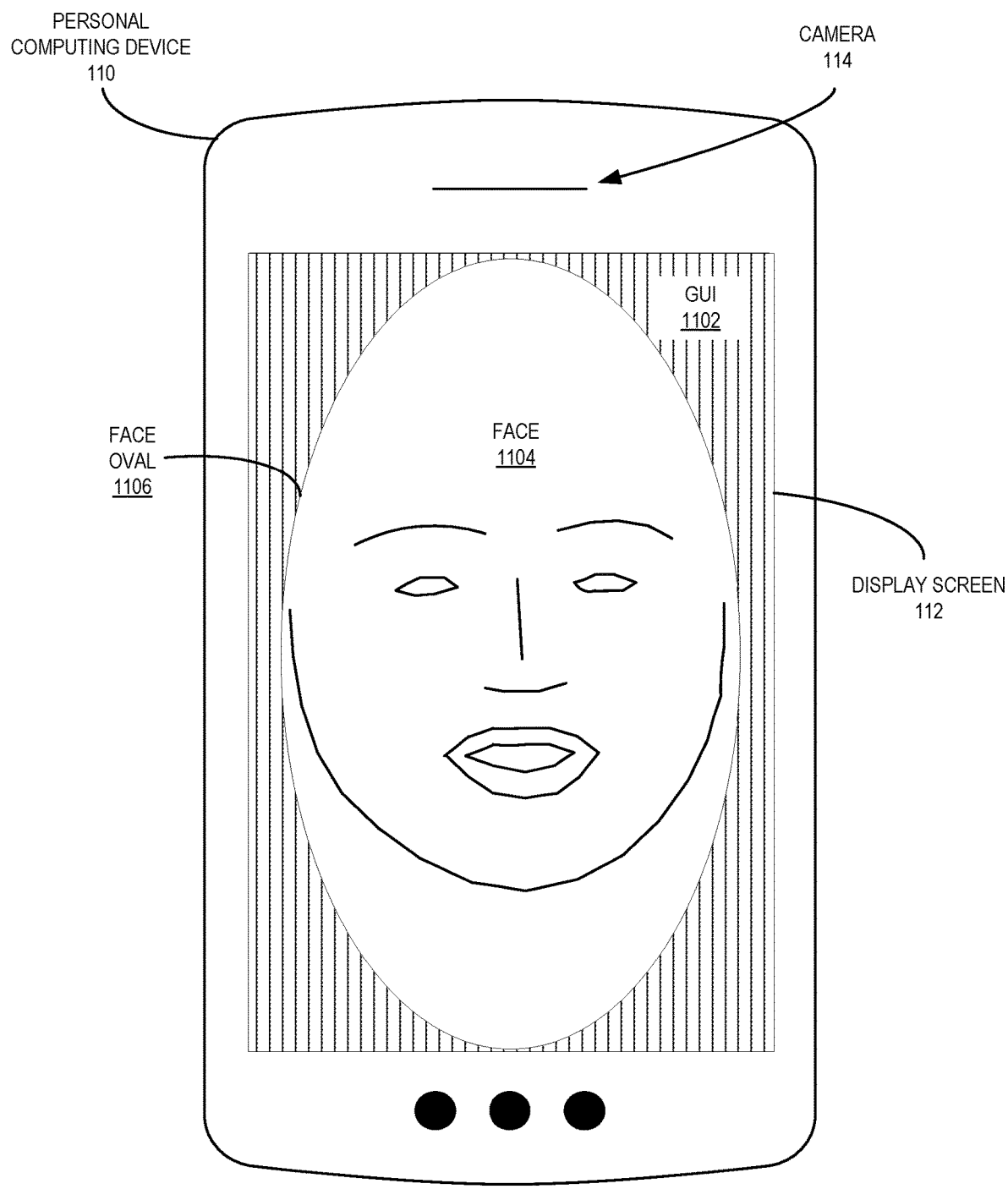

FIG. 11 illustrates third face oval 1106 in the series that can be displayed on screen 112 after user 108 has successfully fit their face 1004 tightly in second face oval 1006, according to some examples. Third face oval 1106 has a larger interior area on screen 112 than second face oval 1006. As a result, user 108 can move their face closer to screen 112 and camera 114 relative to the position of face 1004 when it tightly fit in second face oval 1006 such as, for example, by bringing device 110 closer to the face while holding device 110 and facing screen 112 and camera 114. The target images captured by camera 114 that capture the motion of the face toward screen 112 and camera 114 as the face is moved from fitting tightly within second face oval 1006 to fitting tightly within third face oval 1106 can be sent to liveness detection service 116 from front end 102 for liveness analysis or analyzed at device 110.

In some examples, the size of the first bounding shape in a sequence of face bounding shape is selected based on an initial position of the face of user 108. For example, before the start of a face bounding shape challenge, pre-challenge target images captured by camera 114 can be streamed to liveness detection service 116 or analyzed at device 110. Face detector/tracker 704 can analyze these pre-challenge target images to determine if a detected/tracked face is being held in a steady position and to determine how much of the image area is occupied by the detected/tracked face. The closer the face of user 108 is to camera 114, the more image area the face of user 108 will occupy. The farther away the face of user 108 is from camera 114, the less image area the face of user 108 will occupy. Pre-challenge instructions can instruct user 108 to hold their face from camera 114 in a steady position at a comfortable distance from camera 114. The pre-challenge target images captured by camera 114 of user 108 following these instructions can be streamed to liveness detection service 116 for analysis. Liveness detection service 116 or device 110 can analyze these pre-challenge target images and determine when user 108 has settled into a steady position. Then liveness detection service 116 or device 110 can select a size of the first face bounding shape of the face bounding shape challenge. The size of the first face bounding shape can be such that user 108 is required to move from their face closer to or farther away from screen 112 and camera 114 from the initial steady distance to fit their face tightly within the boundary of the first face bounding shape.

For example, if the initial steady position of the face of user 108 is close to camera 114, then the first face bounding shape may be smaller than a face bounding shape that would tightly fit the face of user 108 in the initial steady position. By doing so, user 108 can be induced to move their face away from screen and 112 camera 114. On the other hand, if the initial steady position of the face of user 108 is away from camera 114, then the first face bounding shape may be larger than a face bounding shape that would tightly fit the face of user 108 in the initial steady position. By doing so, user 108 can be induced to move their face closer to camera 114. Camera 114 can capture the movement of the face of user 108 as user 108 moves their face toward or away from camera 114. These target images can be sent to liveness detection service 116 for liveness analysis.

In some examples, the pre-challenge target images are not sent from device 110 to liveness detection service 116. Instead, to avoid delay of intermediate network(s) 106, device 110 is programmed or configured with a face detection/tracking module for determining when user 108 has positioned their face in an initial steady position. In this case, the face bounding shape challenge can be generated at device 110. Stated otherwise, to avoid pre-challenge delay of round-trip communications over intermediate network(s) 106 between device 110 and liveness detection service 116, functionality of face detector/tracker 704 and face bounding shape generator 702 including any machine learning models used can be located and performed at device 110. Device 110 can be programmed or configured to perform the functionality described above including determining when user 108 has positioned their face in an initial steady position and generating and displaying of a set of one or more face bounding shapes on screen 112 designed to induce movement by user 108 of their face toward or away from screen 112 camera 114. The target images captured by screen 112 and camera 114 of user 108 responding to the face bounding shape challenge can be streamed to liveness detection service 116 for liveness analysis by the motion-based model.

In some examples, at least two face bounding shapes are presented in a face bounding shape challenge. The first is opposite the initial position of user 108 and the second is opposite the first. For example, if the initial steady position of the face of user 108 is relatively close to screen 112 and camera 114, then the first face bounding shape can be sized such that user 108 is induced to move their face away from camera 114 and the second face bounding shape can be sized such that user 108 is induced to move their face closer to camera 114. If the initial steady position of the face of user 108 is relatively far from camera 114, then the first face bounding shape can be sized such that user 108 is induced to move their face closer to camera 114 and the second face bounding shape can be sized such that user 108 is induced to move their face away from camera 114.

While in some examples a face bounding shape challenge is designed to induce motion of face of user 108 toward and away from camera 114, the challenge can be designed to induce other motion. For example, the challenge can prompt user 108 to rotate their head to the left (or right), then to the right (or left) and once again back to the left (or right). In any case, a goal of the challenge can be to induce motion of the face of user 108 that is sufficient to provide enough motion information for a proper liveness analysis by liveness detection service 116.

A gesture validation model can encompass classifier 706. Classifier 706 can be programmed or configured to extract a set of motion features representing motion of a detected/tracked face in a set of target images and classify the motion as to liveness. Classifier 706 can output a liveness score that represents numerically a confidence or probability that the motion of the detected/tracked face in the set of target images is in a particular class of motion. One class of motion is "genuine" motion. Genuine motion is motion by a live human user and not motion by a presentation attack instrument. Another class of motion is "not genuine" or "fake" motion. Fake motion is motion by a presentation attack instrument and not motion by a live human user. Yet another class of motion is "uncertain" motion. Uncertain motion is neither genuine motion nor fake motion. In some examples, classifier 706 is a binary classifier where one of the classes is genuine motion and the other class is fake motion or uncertain motion. In some examples, classifier 706 is a multi-class classifier where the classes include genuine, fake, and motion. In some examples, classifier 706 can further classify fake motion by type of presentation attack (e.g., paper, replay, mask, etc.) In any case, the liveness score can represent a confidence or probability that the motion in the set of target images is in the genuine class.

Classifier 706 can be configured to classify the motion of the detected/tracked face in the set of target images using a variety of different motion modeling techniques. In general, the classifier 706 can be configured with the techniques to distinguish between video of genuine motion by a live user when the user moves their head to fit the face oval displayed on screen from video of fake motion of a presentation attack instrument on the assumption that the genuine movement exhibits different motion and trajectory characteristics than fake motion. In one technique, classifier 706 can be configured to classify the motion using an optical flow technique. Generally speaking, optical flow refers to a pattern of apparent motion of image objects between consecutive video frames caused by the movement of the object or movement of the camera. The optical flow can be represented by a vector field where a vector can be a displacement vector representing the movement of pixels from a first frame/image to a second frame/image.

In this technique, pairs of target images can be input to a trained optical flow estimation model. For each input pair, the estimation model can output an optical flow map (sometimes referred to as an optical flow field). The map can be a vector field representing how pixels of the detected/tracked face in one of the two target images can be moved to form the same detected/tracked face in the other of the two target images. A feature representation of the output flow map can be input into a trained machine learning classifier (e.g., a neural network classifier or a Support Vector Machine (SVM) classifier) that is trained to classify the input flow map into one or more classes of motion. Pairs of target images in the set of target images can be classified this way.

In some examples, pairs of target images are classified in captured time order, and each classified pair must be classified as genuine for decision 708 to determine that the motion of the detected/tracked face in the set of target images is genuine. For example, if the set of target images includes 14 video frames (e.g., A, B, C, . . . M, N), then 13 pairs of time ordered frames can be classified by classifier 706 (e.g., A+B, B+C, . . . M+N) and each of the 13 pairs must be classified by classifier 706 as genuine in order for decision 708 to determine that the face motion in the set of target images is genuine.

The optical flow estimation model and the classifier can be jointly trained based on a training data set that includes pairs of images. Each pair of images can be labeled in the trained data set by a motion class (e.g., "genuine," "fake," etc.) Classifier 706 can be trained in a supervised learning manner to differentiate between genuine motion and fake or presentation attack motion based on the training data set. In some examples, the optical flow estimation model is based on a feature warping technique such as described in the paper by Shengyu Zhao and Yilun Sheng and Yue Dong and Eric I-Chao Chang and Yan Xu; "MaskFlownet: Asymmetric Feature Matching With Learnable Occlusion Mask;" 2020 IEEE/CVF Conference on Computer Vision and Pattern Recognition (CVPR). However, no particular optical flow estimation model and no particular type of machine learning classification model is required and other like optical flow estimation or machine learning classification models that one skilled in the art would understand in light of this disclosure are suitable for the requirements of the particular implementation at hand can be used.

Another technique that classifier 706 can use to classify the motion of the detected/tracked face in the set of target images is based on convolutional neural networks (CNN). In particular, classifier 706 can encompass a CNN model that is trained in a supervised learning manner to classify motion in a video as to liveness (e.g., genuine, fake, type of presentation attack, etc.) Classifier 706 can input the set of target images (video) into the trained CNN model and obtain as output as classification of the motion in the set of target images whether the motion is genuine, fake, uncertain, or the type of presentation attack, etc. In some examples, the CNN model is based on a two-stream inflated 3D convolutional neural network architecture that itself is based on a 2D convolutional neural network inflation such as described in the paper by Carreira, Joao and Zisserman, Andrew; Quo Vadis; "Action Recognition?A New Model and the Kinetics Dataset;" arXiv 2017. In some examples, the CNN model is based on the SlowFast networks for video recognition such as described in the paper by Feichtenhofer, Christoph and Fan, Haoqi and Malik, Jitendra and He, Kaiming; "SlowFast Networks for Video Recognition;" arXiv 2018. In some examples, the CNN model is based on the Tube-CNN for action detection in video such as described in the paper Hou, Rui and Chen, Chen and Shah, Mubarak; "Tube Convolutional Neural Network (T-CNN) for Action Detection in Videos;" arXiv 2017. However, no particular CNN model is required and other like CNN models that one skilled in the art would understand in light of this disclosure are suitable for the requirements of the particular implementation at hand can be used.

Yet another technique that classifier 706 can use to classify the motion of the detected/tracked face in the set of target images is based on a vision transformer model. Generally speaking, a transformer is a deep learning model that uses a self-attention mechanism to differentially weight the significance of different parts of the input data. Classifier 706 can encompass a visual transformer model that is trained in a supervised learning manner to classify motion in a video as to liveness (e.g., genuine, fake, type of presentation attack, etc.) Classifier 706 can input the set of target images (video) into the trained visual transformer model and obtain as output as classification of the motion in the set of target images whether the motion is genuine, fake, uncertain, or the type of presentation attack, etc. In some examples, the transformer model is based on the hierarchical vision transformer that uses shifted windows as described in the paper by Liu, Ze and Lin, Yutong and Cao, Yue and Hu, Han and Wei, Yixuan and Zhang, Zheng and Lin, Stephen and Guo, Baining; "Swin Transformer: Hierarchical Vision Transformer using Shifted Windows;" arXiv 20121. In some examples, the transformer model is based on the multiscale vision transformer model described in the paper by Fan, Haoqi and Xiong, Bo and Mangalam, Karttikeya and Li, Yanghao and Yan, Zhicheng and Malik, Jitendra and Feichtenhofer, Christoph; "Multiscale Vision Transformers;" arXiv 2021. However, no particular vision transformer model is required and other like vision transformer models that one skilled in the art would understand in light of this disclosure are suitable for the requirements of the particular implementation at hand can be used.

Liveness Detection Based on Facial Expression Analysis

If user 108 is genuine, then a color light pattern challenge or face oval challenge when displayed on screen 112 can induce a spontaneous facial expression by user 108. For example, the display of the challenge may cause user 108 to spontaneously blink their eyes, raise their eyebrows, express surprise, or make another facial expression. In some examples, the set of target images is analyzed by liveness detection service 116 to identify macro and micro facial expressions of a detected/tracked face in the set of target images. A detected facial expression can then be analyzed by liveness detection service 116 for genuineness and temporal consistency with respect to the displayed challenge. Doing so can be an effective way to distinguish between genuine users exhibiting a genuine spontaneous facial reaction to a challenge and attacking users using an attack where the impersonated user's face does not exhibit a facial reaction to the challenge.

A macro-expression can be defined as a conscious control of muscles in the face via pyramidal tracts by which motor signals are sent from the brain to lower motor neurons that directly innervate facial muscles to produce a facial action. A macro-expression typically lasts between 0.5 seconds and 4 seconds. Different facial actions are possible. The Facial Action Coding System (FACS) encodes a set of facial muscle movements that correspond to a displayed emotion. In particular, FACS is an index of facial expressions composed of action units (AUs) and action descriptors (Ads). Action units are the fundamental actions of individual facial muscles or groups of muscles. Action descriptors are unitary movements that can involve the actions of several facial muscle groups. The following table lists some main action units with their associated action descriptors under the FACS system.

| Action Unit Number | Action Descriptor |
|---|---|
| 0 | Neutral face |
| 1 | Inner brow raiser |
| 2 | Outer brow raiser |

| Action Unit Number | Action Descriptor |
| --- | --- |
| 4 | Brow lowerer |
| 5 | Upper lid raiser |
| 6 | Cheek raiser |
| 7 | Lid tightener |
| 8 | Lips toward each other |
| 9 | Nose wrinkle |
| 10 | Upper lip raiser |
| 11 | Nasolabial deepener |
| 12 | Lip corner puller |
| 13 | Sharp lip puller |
| 14 | Dimpler |
| 15 | Lip corner depressor |
| 16 | Lower lip depressor |
| 17 | Chin raiser |
| 18 | Lip pucker |
| 19 | Tongue show |
| 20 | Lip stretcher |
| 21 | Neck tightener |
| 22 | Lip funneler |
| 23 | Lip tightener |
| 24 | Lip pressor |
| 25 | Lips part |
| 26 | Jaw drop |
| 27 | Mouth stretch |
| 28 | Lip suck |

In addition to these main codes, the FACS system also encompasses head movement codes (e.g., head turn left, head turn right, head up, head down, etc.), eye movement codes (e.g., eyes turn left, eyes left, eyes right, eyes down, etc.), visibility codes (e.g., brows and forehead not visible, eyes not visible, lower face not visible, etc.), and gross behavior code (e.g., eyes closed, blink, etc.).

A combination of action units can express an emotion such as happiness, sadness, surprise, fear, anger, disgust, contempt, etc. For example, the happiness emotion may encompass a combination of action unit 6 (cheek raiser) and action unit 12 (lip corner puller). As another example, surprise may encompass action unit 1 (inner brow raiser), action unit 2 (outer brow raiser), action unit 5 (upper lid raiser), and action unit 26 (jaw drop).

A micro-expression is a facial expression controlled by extrapyramidal tract pathways and triggered involuntarily. A micro-expression typically lasts less than 0.5 seconds. A challenge displayed on screen 112 can be expected to induce a micro-expression by user 108. The existence of a micro-expression in the set of target images, especially one that is contemporaneous with the display of a color light pattern or face oval challenge on screen 112, suggests that user 108 is genuine. Whereas the absence of a contemporaneous micro-expression in the set of target images suggests that user 108 is an attacking user making a presentation attack or other attack. A micro-expression can correspond to an FACS action unit or a set of action units. However, a perceptible difference between a macro-expression and a micro-expression is that the neutral-onset-apex-offset-neutral cycle of the expression is typically less than 0.5 seconds for a micro-expression and greater than 0.5 seconds and up to 4 seconds for a macro-expression.

Figure 12:
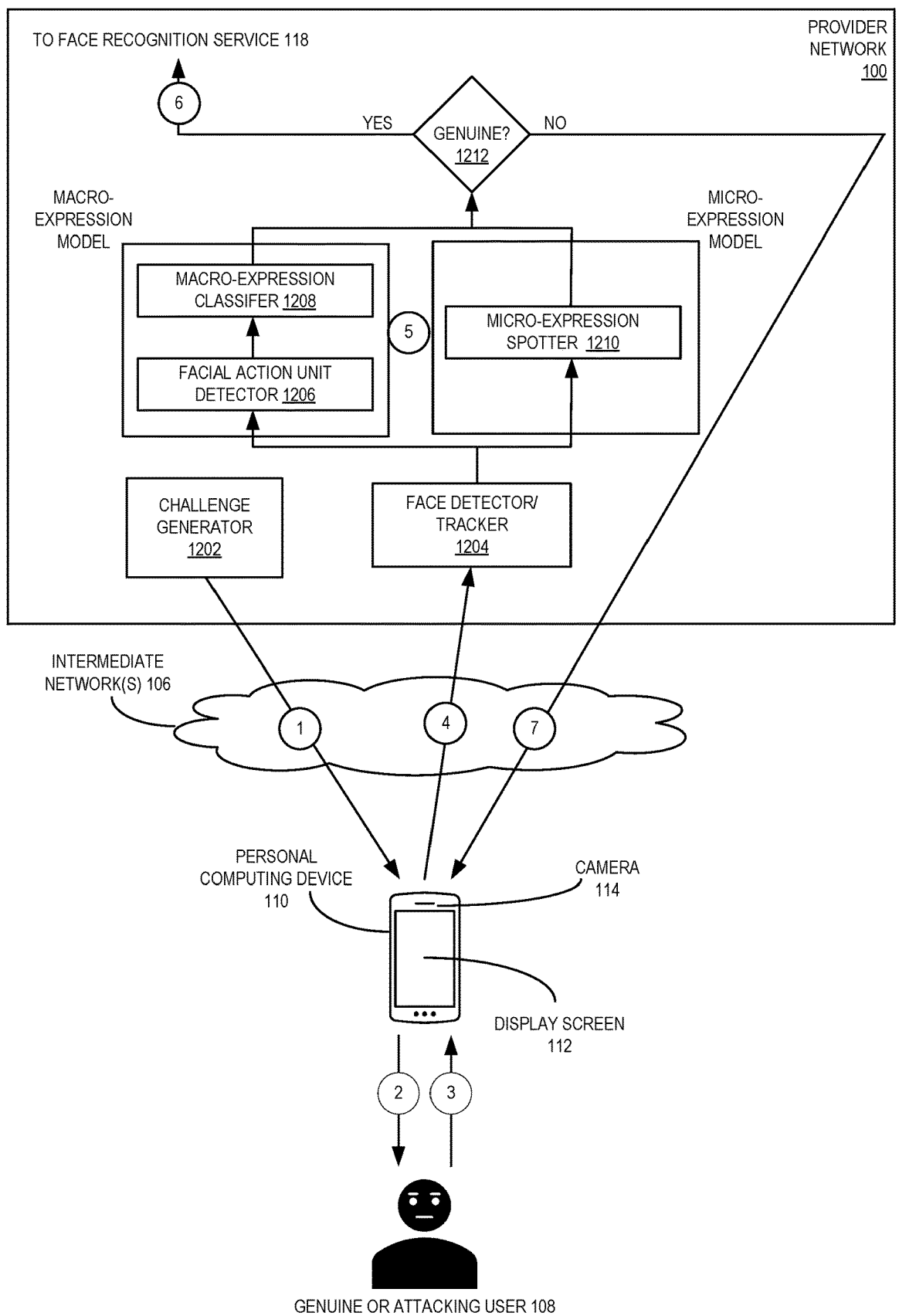
FIG. 12 depicts a face authentication computer system in which a liveness detection service is programmed or configured to perform liveness detection based on facial expression analysis, according to some examples.

FIG. 12 depicts the face authentication computer system of FIG. 1 and in which liveness detection service 116 is programmed or configured to perform liveness detection based on facial expression analysis, according to some examples. Conducting a facial expression analysis for liveness detection is described below in the context of the face authentication process described above with respect to FIG. 1. Like FIG. 1, steps of the face authentication process that performs facial expression analysis for liveness detection are depicted in FIG. 12 as numbered circles. Directional arrows represent a direction of data flow between connected components but not necessarily the exclusive direction. Data represented by directed arrows in FIG. 12 that flows between depicted components can traverse one or more intermediate components (e.g., an intermediate network or computing device). Such an intermediate component may not be depicted in FIG. 12 for the purpose of providing a clear example.

Liveness detection service 116 can be programmed or configured with facial action unit detector 1206 and macro-expression classifier 1208. Detector 1206 can be programmed or configured to analyze each target image of the set of target images in which the detected/tracked face appears. For each target image, the target image can be analyzed by a macro-expression model for the existence of any FACS action units in a set of one or more predetermined FACS action units. For each target image, detector 1206 can output an action unit intensity vector. Each element in the vector can correspond to one of the predetermined FACS action units. The value of the element can numerically or categorically indicate the intensity which corresponding FACS action unit is expressed by the detected/tracked face, if the corresponding FACS action unit is detected in the target image. For example, an element in the vector for action unit 24 (lip pressor) can indicate whether the intensity is one of the following intensity categories ranging from minimal intensity to maximal intensity: (a) trace, (b) slight, (c) marked or pronounced, or (d) severe or extreme. However, other scales are possible, and no particular intensity scale is required. Vector elements corresponding to undetected ones of the predetermined FACS action units in the target image can be missing (sparse vector) or zero to represent the absence of the corresponding FACS action unit in the target image.

In this way, an N-element vector can be generated by detector 1206 for each image in the set of target images where N is the number of predetermined FACS action units that are looked for in the target image by the macro-expression model. The set of predetermined FACS action units can include all FACS action units or a subset thereof such as a subset corresponding to the most common spontaneous facial expressions of genuine users when presented with the color light display challenge or the face oval challenge. The set of generated vectors for the set of target images can then be input to a trained machine learning classifier 1208 (e.g., a Support Vector Machine (SVM) or neural network) to classify the detected macro-expressions in the set of target images as to liveness.

Detector 1206 and classifier 1208 can be jointly trained in supervised learning manner to classify short duration videos (e.g., ten seconds or less) as to the genuineness of the macro-expressions in the videos. A positive training example can contain genuine or realistic macro-expressions that, for example, follow a typical neutral-onset-apex-offset-neutral sequence over the duration of the video. In addition, or alternatively, a positive training example can contain valid spatial and temporal combinations of FACS action units. A negative training example can contain invalid combinations. For example, it is likely that a video of a genuine user expressing surprise is likely to have action unit 1 (Inner brow raiser), action unit 2 (Outer brow), and action unit 26 (Jaw drop) occurring together. While a video of a 3D mask presentation attack might have only action unit 26 (Jaw drop) without also action units 1 and 2.

Returning to the process depicted in FIG. 12, at Step 1, challenge generator 1202 causes a color light pattern challenge, a face oval challenge, or both the color light pattern challenge and the face oval challenge to be displayed on screen 112. In the example depicted in FIG. 12, challenge generator 1202 is a component of liveness detection service 116. However, some or all of challenge generator 1202 can be implemented at device 110 such as, for example, as part of a web or mobile application executing at device 110. At Step 2, the challenge(s) are displayed on screen 112 to user 108 and user 108 responds to the challenge(s) at Step 3. The response can be captured by camera 114 as a set of target images to be analyzed by liveness detection service 116 for liveness. The response by user 108 captured by camera 114 as the set of target images can be genuine or can be an attack such as a presentation attack. At Step 4, the set of target images (video) capturing the response to the challenge(s) by user 108 are uploaded to liveness detection service 116. Note that if user 108 is an attacking user, then the set of target images can contain synthetically generated images or pre-recorded images.

Face detector/tracker 1204 can be programmed or configured like face detector/tracker 204 of FIG. 2 or face detector/tracker 704 of FIG. 7 to detect a face in a target image, to track a face in target images of the set of target images, or to identify face landmarks on a detected/tracked face in a target image. Like with liveness detection based on display screen light reflections or the face oval challenge, face detection, face tracking, or face landmark identification operations can be performed for liveness detection based on a motion-based model at device 110 instead of by face detector/tracker 1204 of liveness detection service 116. Thus, while FIG. 12 depicts face detector/tracker 1204 as a component or module of liveness detection service 116, face detector/tracker 1204 can instead be a component or module of device 110.

At Step 5, liveness detection service 116 analyzes the set of target images for liveness. As depicted, the set of target images can be analyzed by a macro-expression model and a micro-expression model. However, it is also possible for the set of target images to be analyzed by just one of the macro-expression and micro-expression models.

A reason to analyze the set of target images using the macro-expression model is because if a genuine user makes a macro facial expression in response to the challenge(s), that expression can be detected and verified as genuine. At the same time, it is difficult to replicate a genuine facial expression using a presentation attack instrument such as a printed paper or mask. In some examples, user 108 is requested as part of the challenge(s) to make a macro facial expression for capture in the set of target images by camera 114. The requested expression can correspond an emotion recognized as a distinct universal emotion such as happiness, surprise, disgust, sadness, happiness, fear, or anger. For example, the challenge(s) might request user 108 to smile which corresponds to the happiness emotion.

A reason to analyze the set of target images using the micro-expression model is that a micro-expression is involuntary. The color light pattern challenge or the face oval challenge can be expected to induce one or more involuntary micro-expressions in a genuine user. Thus, the absence of a micro-expression in the set of target images is indicative of an attack.

At Step 5, the set of target images can be input to facial action detector 1206. Detector 1206 applies computer vision techniques (e.g., trained convolutional neural networks) to the set of target images to detect instances of facial action units in the face region of the detected/tracked face in the set of target images. In some examples, the computer vision techniques are applied to each target image of the set of target images individually. The result is a "facial action unit" vector indicating the intensities of any facial action units detected in the target image. This may be repeated for each target image in the set of target images to generate a corresponding facial action unit vector for each target image resulting in a set of facial action unit vectors generated for the set of target images. The set of vectors for the set of target images can be ordered according to the temporal order of the set of target images.

The set of facial action unit vectors generated for the set of target images by facial action unit detector 1206 can then be classified by macro-expression classifier 1208 as to liveness. In particular, macro-expression classifier 1208 can be trained in a supervised machine learning fashion as a binary classifier to classify the set of vectors as representing a genuine macro expression or not. The binary classifier can be trained based on sets of vacation action unit vectors some of which represent genuine macro expressions and some of which represent invalid or fake macro expressions such as those that might be presented in a presentation attack. The output of classifier 1208 can be a liveness score reflecting the confidence or probability that the macro-expression present in the set of target images is a genuine macro-expression by a genuine user.

Also at Step 5, the set of target images can be input into micro-expression spotter 1210 which is programmed or configured to identify the temporal location of any micro-expressions detected in the set of target images. Various different techniques can be employed by spotter 1210 to spot micro-expressions in the set of target images including supervised machine learning-based approaches. Possible supervised machine learning-based approaches that can be used include spatial-temporal feature methods, CNN-based methods, and LSTM-based methods. An example of a spatial temporal feature method for micro-expression spotting is described in the paper by T. -K. Tran, X. Hong, G. Zhao; "Sliding window based micro-expression spotting: a benchmark;" International Conference on Advanced Concepts for Intelligent Vision Systems, Springer (2017), pp. 542-553. An example of a CNN-based method for micro-expression spotting is described in the paper by Z. Zhang, T. Chen, H. Meng, G. Liu, X. Fu; "Smeconvnet: a convolutional neural network for spotting spontaneous facial micro-expression from long videos;" IEEE Access, 6 (2018), pp. 71143-71151. An example of an LSTM-based method for micro-expression spotting is described in the paper by T. Tran, N. V Q, X. Hong, G. Zhao, Dense prediction for micro-expression spotting based on deep sequence model, in: Proc. Electronic Imaging, 2019.

The output of micro-expression spotter 1210 can be temporal information indicating when on a temporal dimension of the set of target images a micro-expression was spotted. Multiple micro-expressions can be spotted in the same set of target images. The temporal information for a spotted micro-expression can be a frame or image number of the set of target images or a timestamp corresponding to a frame or image of the set of target images. In some examples, the temporal information can also indicate whether the corresponding video frame or image depicts the onset, the apex, or the offset of the spotted micro-expression.

Decision 1212 determines whether user 108 is a genuine user or not a genuine user (e.g., an attacking user) based on the output of the macro-expression model, the output of the imicro-expression model, or both the output of the macro-expression model and the output of the nicro-expression model. The output of the macro-expression model can be a liveness score that indicates the confidence or probability that user 108 is a genuine user or not based on the analysis of macro-expression(s) in the set of target images. In this case, decision module 1212 can determine that user 108 is genuine if the liveness score is above a liveness score threshold. The output of the micro-expression model can be temporal information for micro-expressions spotted in the set of target images. In some examples, decision 1212 determines that user 108 is genuine if at least one micro-expression is spotted in the set of target images on the condition that the color light pattern challenge or the face oval challenge should induce at least one micro-expression in user 108 if user 108 is genuine. If no micro-expressions are spotted, then decision 1212 can determine that user 108 is not genuine on the same condition. If both the output of the macro-expression mode and the output of the micro-expression model are used by decision module 1212, then decision module 1212 can determine that user 108 is genuine if the liveness score output by the macro-expression is above threshold and at least one micro-expression is spotted. If either the liveness score is below the threshold or no micro-expression is spotted, then decision module 1212 can determine that user 108 is not genuine. In some examples, if the output of the macro-expression model indicates that no macro-expressions were detected, then decision module 1212 can determine whether user 108 is genuine based on the output of the micro-expression model.

Concurrency Validation

The color light pattern challenge is based on displaying different colors on screen 112 in a sequence. If user 108 is genuine, then the display of a color that contrasts with the previous color displayed should induce a micro-expression (e.g., eye blink or surprise) in user 108 contemporaneous with the display of the contrasting color. In some examples, decision module 1202 verifies that a micro-expression (e.g., an eye blink) is spotted for a color of the color light pattern challenge displayed on screen 112 including verifying that there is temporal consistency between the time of the spotted micro-expression and the display of the color. Temporal inconsistency is indicative of user 108 not being genuine.

Figure 13:
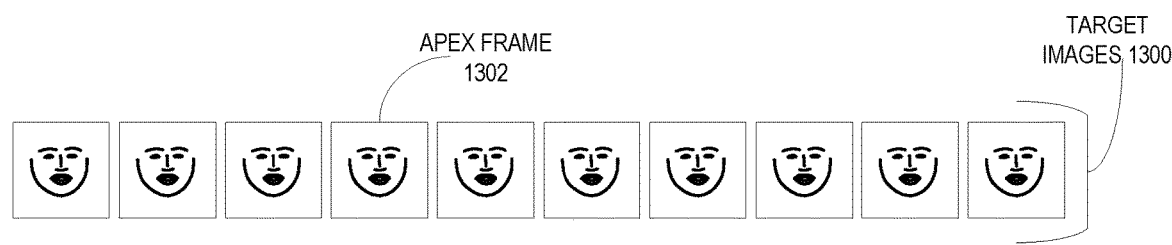
FIG. 13 illustrates two examples of determining temporal consistency between spotted micro-expressions and the display of the color light pattern challenge, according to some examples.
Figure 13:
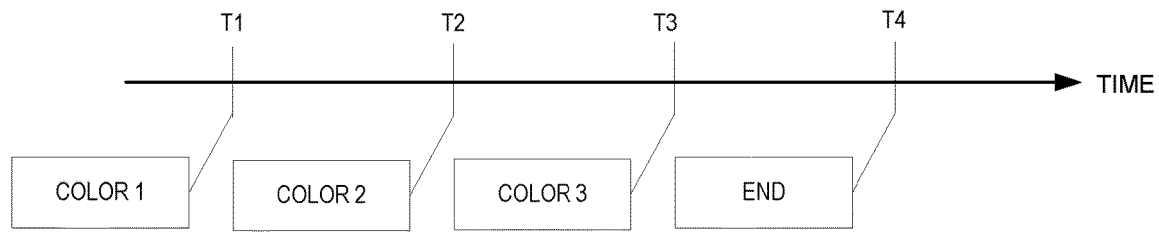
Figure 13:
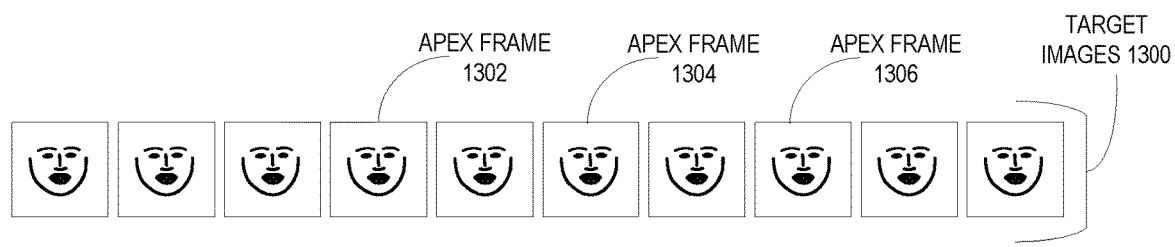
Figure 13:
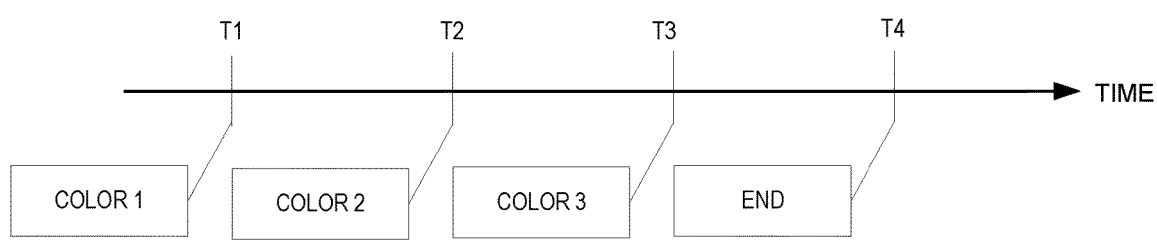

FIG. 13 illustrates two examples of determining whether there is temporal consistency between spotted micro-expressions and the display of the color light pattern challenge, according to some examples. In both examples, three colors are displayed in sequence over time starting with display of Color 1 at time T1, followed by display of Color 2 at time T2, and followed by display of Color 3 at time T3. Color 1 is displayed continuously between times T1 and T2, Color 2 is displayed continuously between times T2 and T3, and Color 3 is displayed continuously between times T3 and T4. The display of the challenge ends at time T4. Each color can be selected so that it contrasts with the prior color and such that the transition between colors should induce a micro-expression in a genuine user viewing the display screen on which the color light pattern challenge is displayed. Prior to display of Color 1 at time T1, a default color such as black can be displayed and Color 1 can be selected to contrast with the default color.

In the first example, decision module 1212 can determine whether an apex frame 1302 of a micro-expression spotted in the set of target images 1300 occurs after time T1 when Color 1 is displayed and before Color 2 is displayed. The time between T1 and T2 can be selected such that the micro-expression induced by the display of Color 1 should complete the neutral-onset-apex-offset-neutral cycle of the micro-expression within that time span. For example, the time between T1 and T2 can be at least 0.5 seconds. Apex frame 1302 can be a frame or image determined by micro-expression spotter 1210 to contain the apex of the micro-expression when the micro-expression is at its most expressive and in between the onset of the micro-expression and before the offset of the micro-expression. If decision nodule 1212 determines that micro-expression spotter 1210 has detected apex frame 1302 with a time that is in between time T1 and T2, then decision module 1212 can determine that user 108 is genuine on the condition that the display of Color 1 at time T1 should induce a micro-expression in user 108 that reaches its apex before the display of Color 2 at time T2, if user 108 is genuine. If spotter 1210 did not detect an apex frame 1302 with a time in between time T1 and T2, then decision module 1212 can determine that user 108 is not genuine.

In the above example, it is assumed that the time between transitioning colors (e.g., the time between time T1 and time T2) is at least as long as a typical length of a micro-expression cycle (e.g., 0.5 seconds). However, it is possible for the transition to be shorter than the typical micro-expression cycle length. In this case, a micro-expression induced by the display of Color 1 at time T1 may not reach its apex by time T2. In this case, decision module 1212 can determine whether an apex frame 1302 occurs after time T1 and before time T3 or time T4 or other target time that is at least the typical length of a micro expression (e.g., 0.5 seconds) after time T1. If decision nodule 1212 determines that micro-expression spotter 1210 has detected apex frame 1302 with a time that is in between time T1 and the target time, then decision module 1212 can determine that user 108 is genuine on the condition that the display of Color 1 at time T1 should induce a micro-expression in user 108 that reaches its apex before the target time, if user 108 is genuine. If spotter 1210 did not detect an apex frame 1302 with a time in between time T1 and the target time, then decision module 1212 can determine that user 108 is not genuine.

In the second example, instead of verifying that spotter 1210 detected an apex frame in between display of the first and second colors, decision module 1212 verifies that spotter 1210 detects an apex frame for each color transition. In particular, decision module 1212 verifies that spotter 1210 detected apex frame 1302 of a first micro-expression at a time in between times T1 and T2, detected apex frame 1304 of a second micro-expression at a time in between times T2 and T3, and detected apex frame 1306 of a third micro-expression at a time in between times T3 and T4. Decision module 1212 can determine that user 108 is genuine on the condition that the display of each color of the color light pattern challenge should induce a micro-expression in user 108 that completes before the display of the next color or the end of the of the color light pattern challenge. If spotter 1210 did not detect an apex frame for each color as in the example, then decision module 1212 can determine user 108 is not genuine.

While in some examples it is determined whether spotter 1210 detected an apex frame of a micro-expression, decision module 1212 determines whether spotter 1210 detected a complete micro-expression cycle that includes at least one onset frame, at least one apex frame following the at least one onset frame, and at least one offset frame following the at least one apex frame. Spotter 1210 can be programmed or configured to use machine learning techniques to spot a micro-expression in the set of target images. Such spotting may include the using the machine learning techniques to classify images of the set of target images as to which part of a micro-expression cycle the face depicted in the image is in. A micro-expression cycle can have five sequenced parts: (1) neutral, (2) onset, (3) apex, (4) offset, and (5) neutral. As mentioned, the apex refers to when the micro-expression is at its most expressive. The onset refers to when the micro-expression is transitioning from a neutral expression to the apex. The offset refers to when the micro-expression is transitioning from the apex to a neutral expression. A neutral expression is a facial expression other than the onset, apex, or offset of the micro-expression. A valid micro-expression cycle in the set of target images can encompass one or more neutral expression frames, followed by one or more onset expression frames, followed by one or more apex expression frames, followed by one or more offset expression frames, followed by one or more neutral expression frames.

In some example, decision module 1212 can determine whether a complete micro-expression cycle occurs within a selected time window where the start of the selected time window corresponds to an event that should induce a micro-expression in user 108 if user 108 is genuine (e.g., display of a color of the color light challenge) and the end of the selected time window corresponds to when the induced micro-expression should have completed. For example, referring to the first example of FIG. 13, decision module 1212 can determine whether spotter 1210 spotted a micro-expression that starts after time T1 and completes before time T4. The start of the micro-expression corresponds to an onset frame of the micro-expression and the end of the micro-expression corresponds to an offset frame of the micro-expression with an apex frame of the micro-expression in between the onset frame and the offset frame in time order of the set of the target images. If the time of the onset frame is after the start time of the selected time window (e.g., time T1) and the time of the offset frame is before the end time of the selected time window (e.g., time T4), then decision module 1212 can determine that user 108 is genuine. Otherwise, if spotter 1210 did not detect a complete onset-apex-offset frame sequence in the set of target images that falls within the selected time window, then decision module 1212 can determine that user 108 is not genuine.

A benefit of decision module 1212 checking for a valid micro-expression cycle as opposed to just an apex frame is that such checking can catch (prevent) simple presentation, injection, or deep fake attacks where the same facial expression pose is depicted in one or more images of the set of target images without any onset or offset poses.

While in some examples decision module 1212 verifies temporal consistency of a micro-expression with respect to a color light pattern challenge, decision module 1212 verifies the temporal consistency of a micro-expression with respect to a face oval challenge in addition to or instead of verifying the temporal consistency of a micro-expression with respect to the color light pattern challenge. For example, decision module 1212 can determine whether a complete micro-expression cycle occurs within a selected time window when the start of the selected time window corresponds to when the face oval challenge begins (e.g., the face oval is displayed on screen 112), and the end of the selected time window corresponds when the induced micro-expression should have completed.

Figure 14:
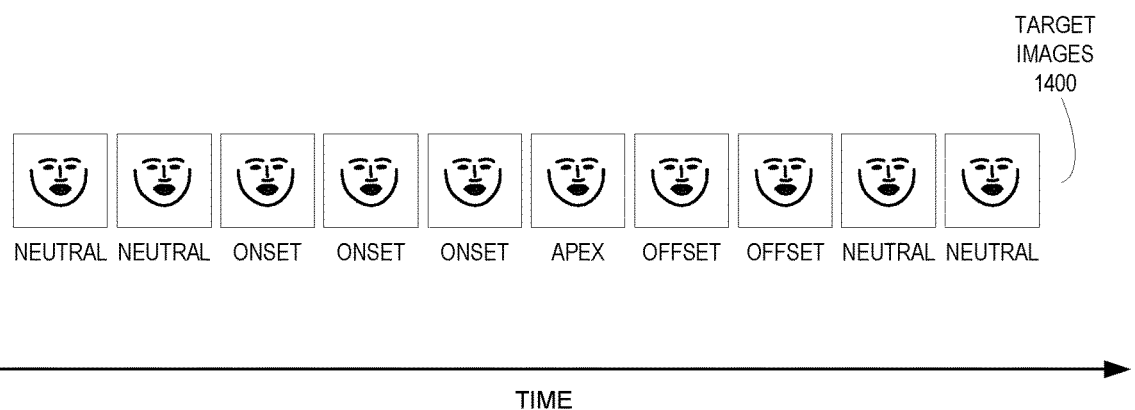
FIG. 14 illustrates an example micro-expression cycle, according to some examples.

FIG. 14 illustrates an example micro-expression cycle, according to some examples. Spotter 1210 can spot a micro-expression in set of target images 1400. In doing so, spotter 1210 can tag or label one or more images according to their determined part in the micro-expression cycle. As shown, over increasing time of set of target images 1400, a single image can be tagged or labeled by spotter 1210 as depicting the apex of the spotted micro-expression. In addition, one or more images preceding the apex image in time can be tagged or labeled by spotter 1210 as depicting the onset of the spotted micro-expression and one or more images following the apex image in time can be tagged or labeled by spotter 1210 as depicting the offset of the spotted micro-expression. One or more images preceding the onset image(s) or one or more images following the offset image (s) can be tagged or labeled by spotter 1210 as neutral images determined by spotter 1210 to not depict a part of a spotted micro-expression.

Figure 15:
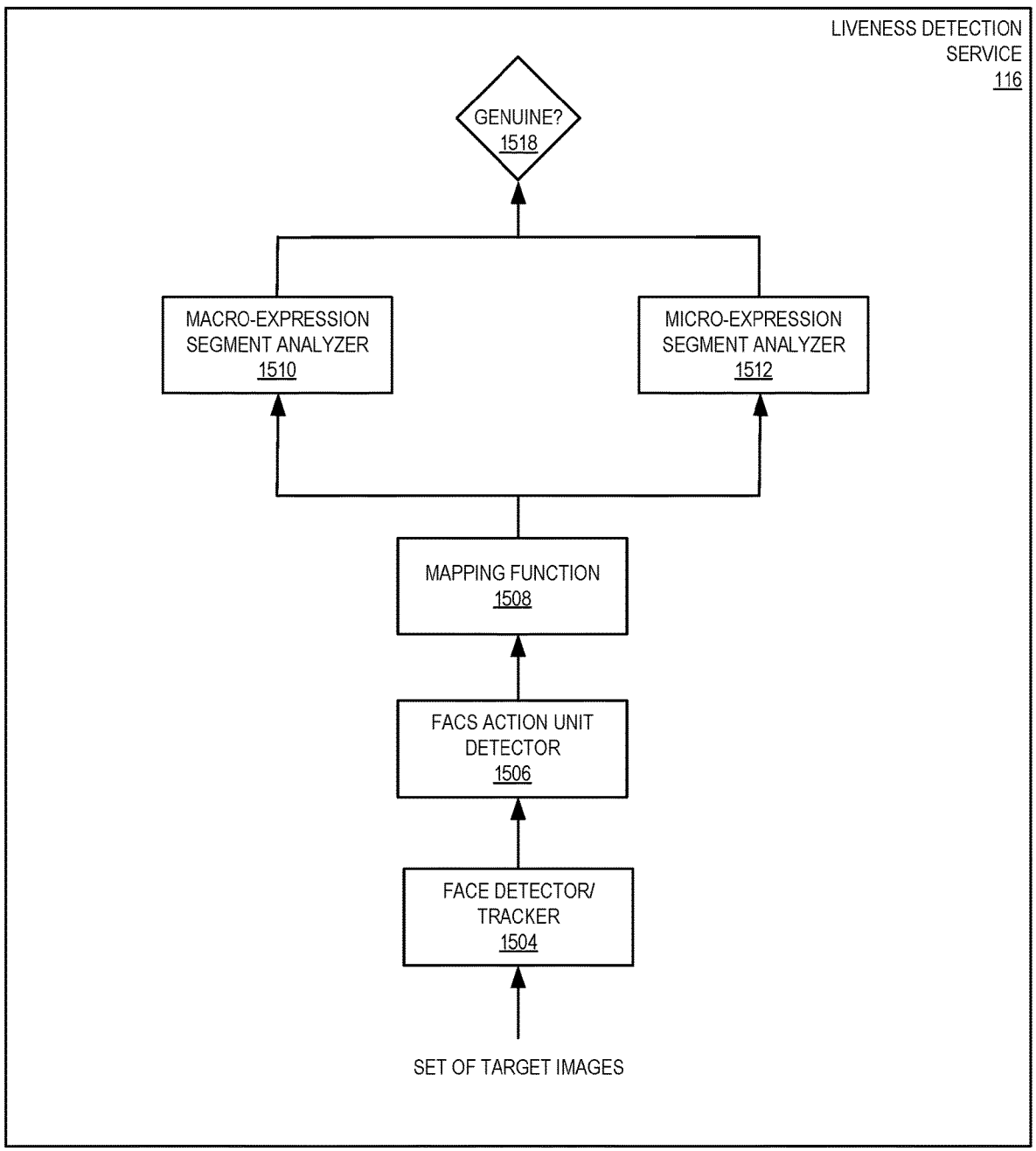
FIG. 15 depicts a liveness detection service programmed or configured to perform liveness detection based on facial expression analysis of both macro-expressions and micro-expressions, according to some examples.

FIG. 15 depicts liveness detection 116 service programmed or configured to perform liveness detection based on facial expression analysis of both macro-expressions and micro-expressions, according to some examples. A set of target images is input to face detector/tracker 1504.

Face detector/tracker 1504 is programmed or configured to use machine learning-based computing visions techniques (e.g., convolutional neural networks) to detect or track a face that appears in the set of target images. The face can be a genuine face of user 108 or a face impersonated by attacking user 108. The result of face detector/tracker 1504 can be coordinates of a bounding box around the area or region of the detected/tracked face in each image of the set of target images and coordinates of facial landmarks in the area or region of the detected/tracked face in each image of the set of target images.

The area or region of the detected/tracked face in each image of the set of target images can be cropped from the image and input to Facial Action Coding System (FACS) action unit detector 1506. FACS action unit detector 1506 can be programmed or configured to use machine learning-based computing vision techniques (e.g., convolutional neural networks) to detect and classify the facial expression of the detected/tracked face in the image according to FACS. The classification of the facial expression can encompass a set of one or more FACS action unit numbers representing the detected facial expression. Detector 1506 can output a two-dimensional tensor where one dimension represents a set of possible FACS action units that detector 1506 is configured or programmed to detect and classify and the other dimension is the set of target images. A magnitude value in the tensor for a particular FACS action unit and a particular target image can represent the intensity with which the particular FACS action unit is expressed by the facial expression in the particular target image. For example, the intensity can be one of the following intensity categories ranging from minimal intensity to maximal intensity: (a) trace, (b) slight, (c) marked or pronounced, or (d) severe or extreme. Other intensity scales or categories can be used. The magnitude value can be zero or absent (sparse tensor) if the particular FACS action unit is not expressed by the facial expression in the particular target images according to the analysis conducted by detector 1506.

Mapping function 1508 analyzes the tensor output by detector 1506 for macro-expressions and micro-expressions. The analysis can include segmenting the tensor into expression segments. An expression segment can be a sub-tensor corresponding to a set one or more target images in which the intensities of FACS action units in the sub-tensor indicate that a micro-expression or a macro-expression is present in the corresponding set of target images.

In some examples, mapping function 1508 classifies the expression segment as representing a micro expression or a macro expression depending on the time duration of expression segment. The time duration of the expression segment corresponds to a period of time during which the micro expression or the macro expression is expressed in the corresponding set of target images. In some examples, if the time duration is at or below a threshold amount of time (e.g., 0.5 seconds), then the expression segment can be classified by mapping function 1508 as a micro-expression. If the time duration is at or above the threshold amount of time (e.g., 0.5 seconds), then the expression segment can be classified by mapping function 1508 as a macro-expression. The classified expression segment can be sent to macro-expression segment analyzer 1510 or micro-expression segment analyzer 1512 for further analysis depending on whether mapping function 1508 classifies the expression segment as containing a micro-expression (send to micro-expression segment analyzer 1512) or a macro-expression (send to macro-expression segment analyzer 1510).

Macro expression segment analyzer 1510 can be programmed or configured to determine if a macro-expression segment contains a presentation attack. An impersonated face of a presentation attack typically will not exhibit natural combinations of FACS action units. For example, if user 108 is an attacking user wearing a mask made of flexible material such as silicone, then the attacking user's facial muscles are controlling the appearance of the mask which does not appear as genuine face movement. The FACS action units and intensities in this case will likely not correspond to FACS action units and intensities of a natural (genuine) facial expression. Thus, macro expression segment analyzer 1510 can analyze the occurrence and intensities of FACS action units of the expression segment to determine if the macro expression is a genuine facial expression or an impersonated one. In some examples, the expression segment is classified as a genuine or not or classified as genuine or type of presentation attack (e.g., mask, paper, etc.) using a trained machine learning classifier.

Micro expression segment analyzer 1512 can be programmed or configured to analyze the micro-expression segment to determine if there is temporal consistency between the micro-expression and the color light pattern challenge or the face bounding shape challenge. A genuine user should express a micro-expression at time that is consistent with the time of a challenge such as, for example, during the challenge or in response to the display of a challenge such as, for example, just after display of a color or just after display of a face bounding shape. In addition, the micro-expression should exhibit the neutral-onset-apex-offset-neutral cycle pattern. The micro-expression segment including FACS action unit intensity values can be analyzed by micro-expression segment analyzer 1512 to determine if the presented micro-expression exhibits the cycle pattern. Analyzer 1512 can also analyze the micro-expression segment to determine if the time of the onset of the cycle or the time of the apex of the cycle is temporally consistent with the time a challenge is displayed. For this, capture times of the corresponding set of target images by camera 114 can be compared to display times of a challenge on screen 112 such as a display time of a color of the color light pattern challenge or a display time of a face bounding shape of the face bounding shape challenge.

Decision module 1518 can determine that user 108 is genuine or output a liveness score based on the analysis of expression segments analyzed by macro-expression segment analyzer 1510 and micro-expression segment analyzer 1512. Analyzers 1510 and 1512 can output a liveness score for each expression segment analyzed. Decision module 1518 can aggregate the liveness scores output by analyzers 1510 and 1512 into a final liveness score (e.g., as an average or weighted average). A determine of whether user 108 is genuine or not can be made based on the final liveness score. For example, decision module 1518 can determine that user 108 is genuine based on the final liveness score being above a threshold or decision module 1518 can output the final liveness score to another decision module (not shown) that makes a liveness determination based on one or more other liveness scores output by one or more other liveness detection modules (e.g., the display screen light reflection module of FIG. 2 or the gesture validation module of FIG. 7.)

Example Provider Network

Figure 16:
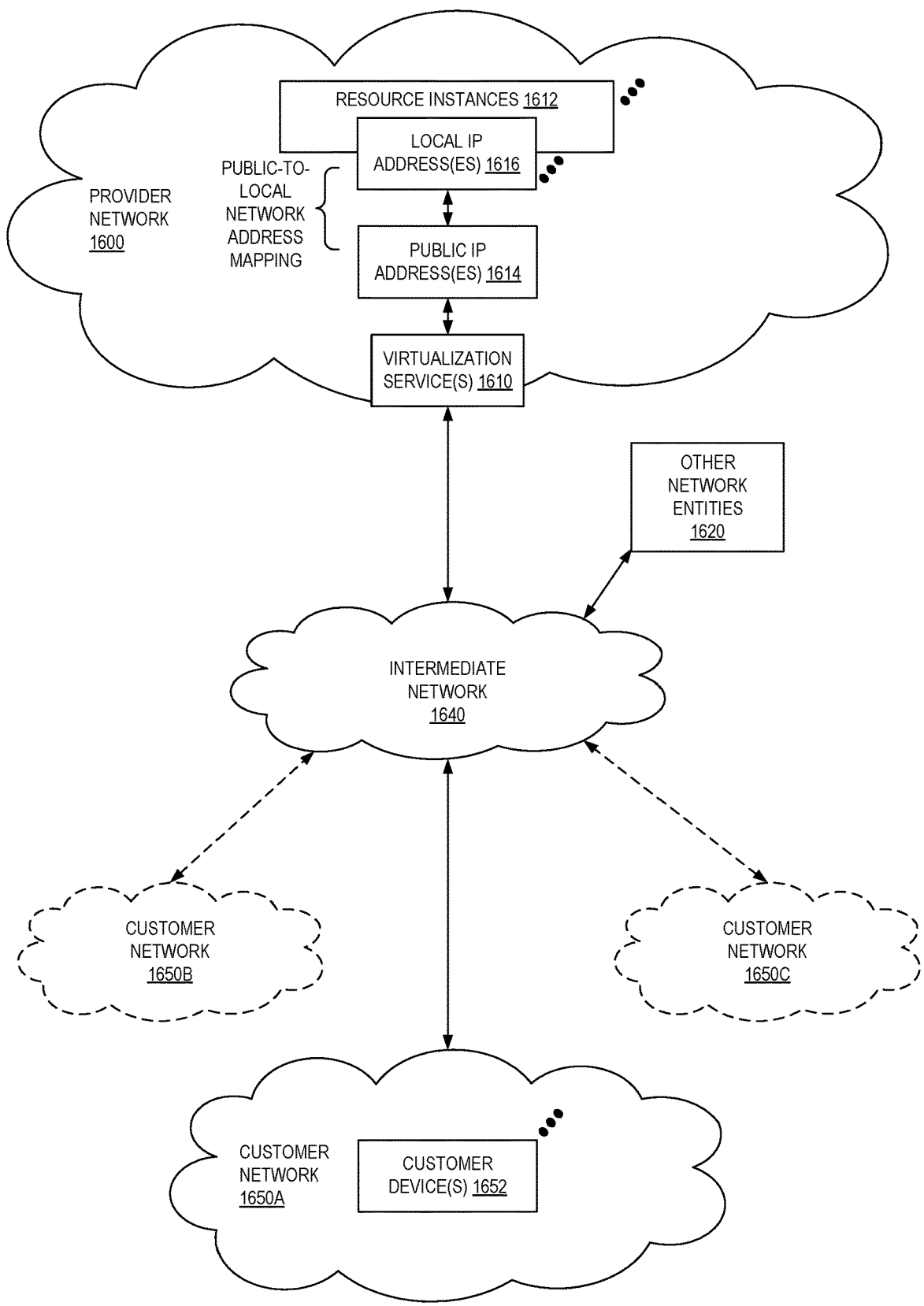
FIG. 16 illustrates an example provider network environment, according to some examples.

FIG. 16 illustrates an example provider network (or "service provider system") environment according to some embodiments. A provider network 1600 can provide resource virtualization to customers via one or more virtualization services 1610 that allow customers to purchase, rent, or otherwise obtain instances 1612 of virtualized resources, including but not limited to computation and storage resources, implemented on devices within the provider network or networks in one or more data centers. Local Internet Protocol (IP) addresses 1616 can be associated with the resource instances 1612; the local IP addresses are the internal network addresses of the resource instances 1612 on the provider network 1600. In some embodiments, the provider network 1600 can also provide public IP addresses 1614 and/or public IP address ranges (e.g., Internet Protocol version 4 (IPv4) or Internet Protocol version 6 (IPv6) addresses) that customers can obtain from the provider 1600.

Conventionally, the provider network 1600, via the virtualization services 1610, can allow a customer of the service provider (e.g., a customer that operates one or more customer networks 1650A-1650C (or "client networks") including one or more customer device(s) 1652) to dynamically associate at least some public IP addresses 1614 assigned or allocated to the customer with particular resource instances 1612 assigned to the customer. The provider network 1600 can also allow the customer to remap a public IP address 1614, previously mapped to one virtualized computing resource instance 1612 allocated to the customer, to another virtualized computing resource instance 1612 that is also allocated to the customer. Using the virtualized computing resource instances 1612 and public IP addresses 1614 provided by the service provider, a customer of the service provider such as the operator of the customer network(s) 1650A-1650C can, for example, implement customer-specific applications and present the customer's applications on an intermediate network 1640, such as the Internet. Other network entities 1620 on the intermediate network 1640 can then generate traffic to a destination public IP address 1614 published by the customer network(s) 1650A-1650C; the traffic is routed to the service provider data center, and at the data center is routed, via a network substrate, to the local IP address 1616 of the virtualized computing resource instance 1612 currently mapped to the destination public IP address 1614. Similarly, response traffic from the virtualized computing resource instance 1612 can be routed via the network substrate back onto the intermediate network 1640 to the source entity 1620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1600; a customer can then assign their allocated public IP addresses to particular resource instances allocated to the customer. These public IP addresses can be referred to as customer public IP addresses, or simply customer IP addresses. Instead of being assigned by the provider network 1600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 17:
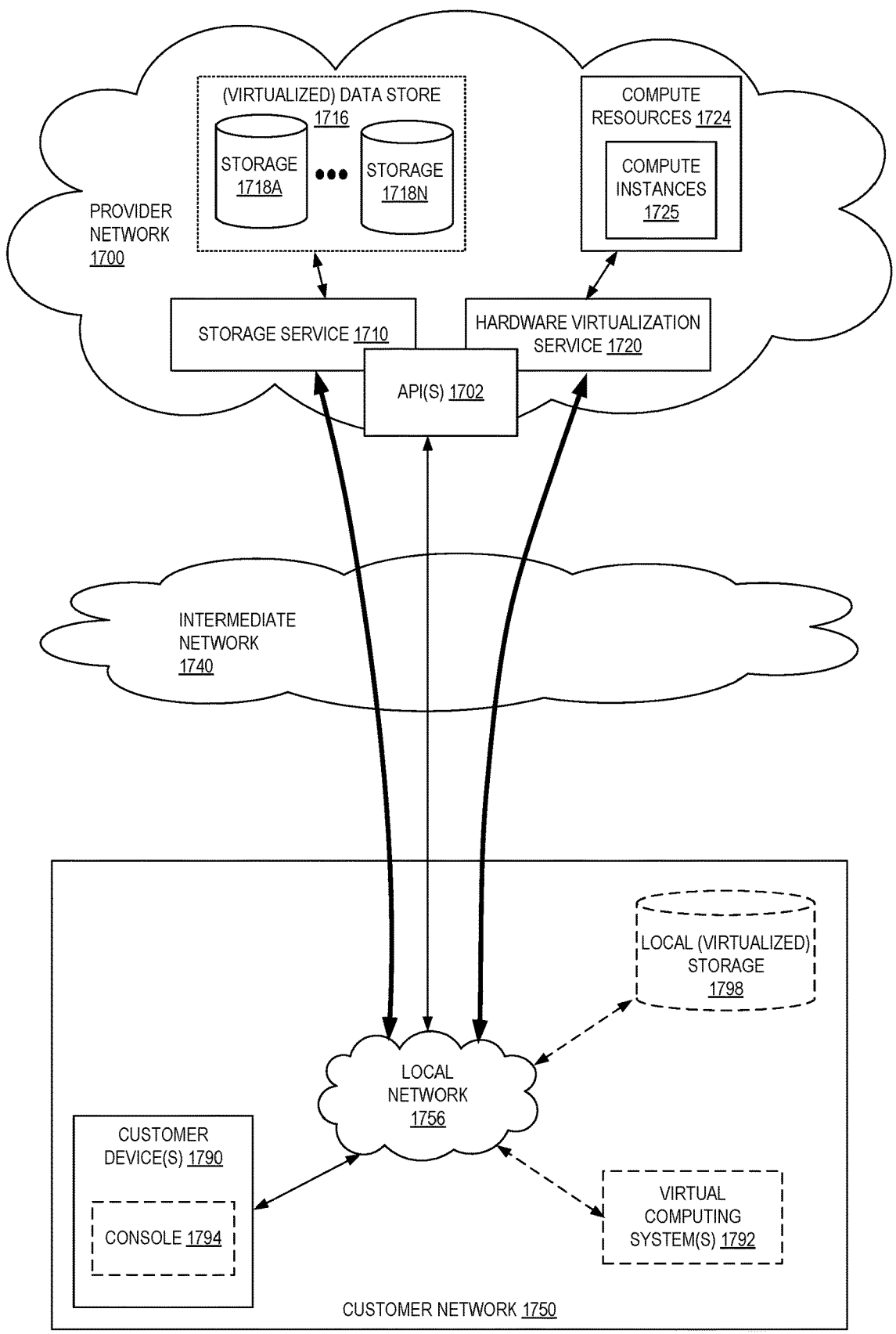
FIG. 17 is a block diagram of an example provider network that provides a storage service and a hardware virtualization service to customers, according to some examples.

FIG. 17 is a block diagram of an example provider network environment that provides a storage service and a hardware virtualization service to customers, according to some embodiments. A hardware virtualization service 1720 provides multiple compute resources 1724 (e.g., compute instances 1725, such as VMs) to customers. The compute resources 1724 can, for example, be provided as a service to customers of a provider network 1700 (e.g., to a customer that implements a customer network 1750). Each computation resource 1724 can be provided with one or more local IP addresses. The provider network 1700 can be configured to route packets from the local IP addresses of the compute resources 1724 to public Internet destinations, and from public Internet sources to the local IP addresses of the compute resources 1724.

The provider network 1700 can provide the customer network 1750, for example coupled to an intermediate network 1740 via a local network 1756, the ability to implement virtual computing systems 1792 via the hardware virtualization service 1720 coupled to the intermediate network 1740 and to the provider network 1700. In some embodiments, the hardware virtualization service 1720 can provide one or more APIs 1702, for example a web services interface, via which the customer network 1750 can access functionality provided by the hardware virtualization service 1720, for example via a console 1794 (e.g., a web-based application, standalone application, mobile application, etc.) of a customer device 1790. In some embodiments, at the provider network 1700, each virtual computing system 1792 at the customer network 1750 can correspond to a computation resource 1724 that is leased, rented, or otherwise provided to the customer network 1750.

From an instance of the virtual computing system(s) 1792 and/or another customer device 1790 (e.g., via console 1794), the customer can access the functionality of a storage service 1710, for example via the one or more APIs 1702, to access data from and store data to storage resources 1718A-1718N of a virtual data store 1716 (e.g., a folder or "bucket," a virtualized volume, a database, etc.) provided by the provider network 1700. In some embodiments, a virtualized data store gateway (not shown) can be provided at the customer network 1750 that can locally cache at least some data, for example frequently accessed or critical data, and that can communicate with the storage service 1710 via one or more communications channels to upload new or modified data from a local cache so that the primary store of data (the virtualized data store 1716) is maintained. In some embodiments, a user, via the virtual computing system 1792 and/or another customer device 1790, can mount and access virtual data store 1716 volumes via the storage service 1710 acting as a storage virtualization service, and these volumes can appear to the user as local (virtualized) storage 1798.

While not shown in FIG. 17, the virtualization service(s) can also be accessed from resource instances within the provider network 1700 via the API(s) 1702. For example, a customer, appliance service provider, or other entity can access a virtualization service from within a respective virtual network on the provider network 1700 via the API(s) 1702 to request allocation of one or more resource instances within the virtual network or within another virtual network.

Example Computer System

Figure 18:
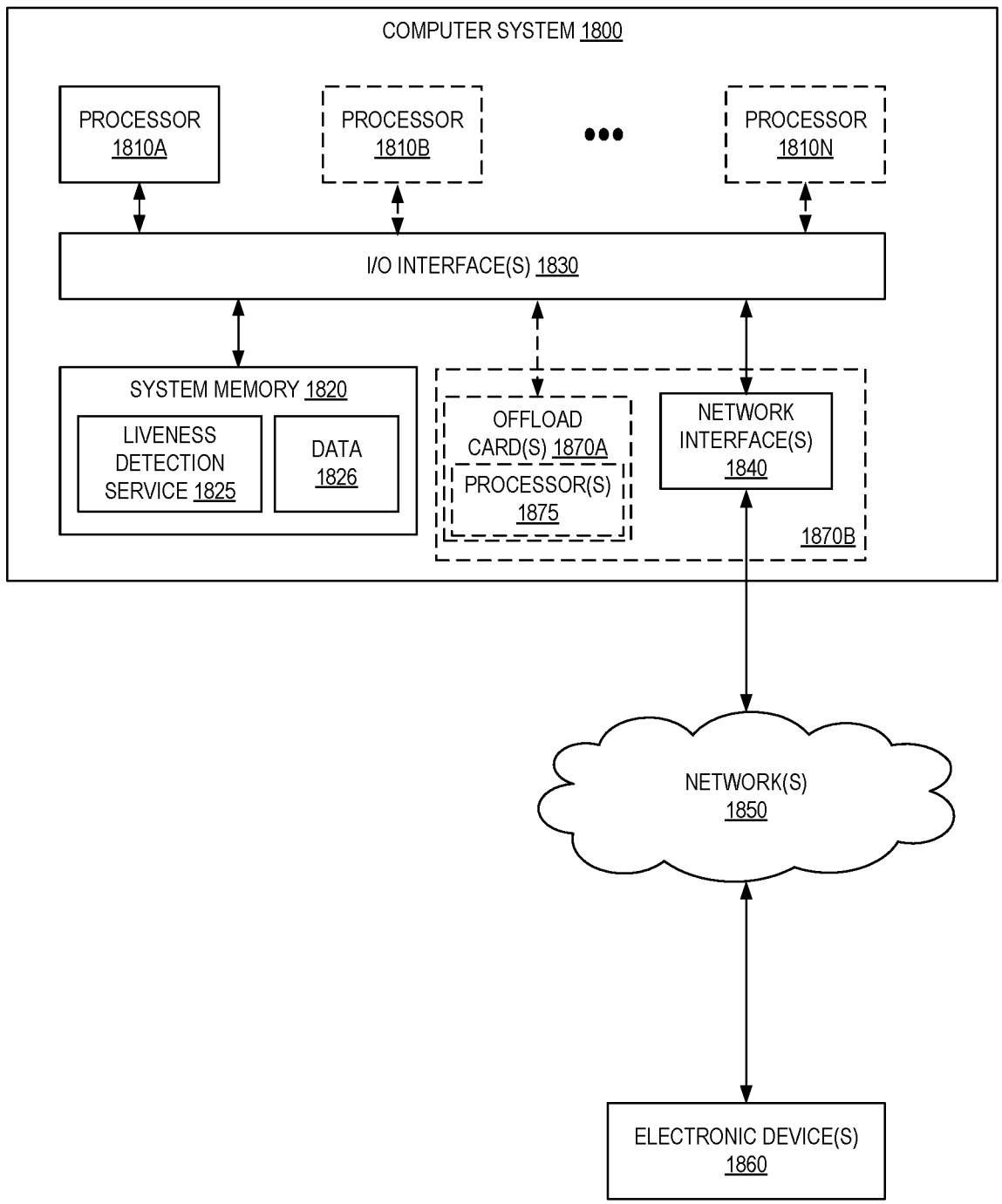
FIG. 18 is a block diagram illustrating an example computer system that can be used in some examples.

FIG. 18 illustrates computer system 1800 that can be used in an implementation of techniques disclosed herein for ontology-based service dependency modeling in a provider network, according to some examples. Computer system 1800 can include one or more processors 1810 coupled to system memory 1820 via input/output (I/O) interface 1830. System 1800 can further include network interface 1840 coupled to I/O interface 1830.

While FIG. 18 shows computer system 1800 as a single computing device, in some examples computer system 1800 can include one computing device or any number of computing devices configured to work together as an overall computer system 1800 as in a distributed, parallel, clustered, or other coupled computing system arrangement.

Computer system 1800 can be a uniprocessor system including one processor 1810, or can be a multiprocessor system including several processors 1810 (e.g., two, four, eight, or another suitable number). Processor(s) 1810 can be any suitable processor(s) capable of executing instructions. For example, in various embodiments, processor(s) 1810 can be general-purpose or embedded processors implementing any of a variety of instruction set architectures (ISAs), such as the X86, ARM, POWERPC, SPARC, or MIPS ISAs, or any other suitable ISA. In multiprocessor systems, each of processors 1810 can commonly, but not necessarily, implement the same ISA.

System memory 1820 can store instructions and data accessible by the processor(s) 1810. In various embodiments, system memory 1820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1820 as accuracy regression detection code 1825 (e.g., executable to implement, in whole or in part, techniques disclosed herein for accuracy regression detection for time series anomaly detection compute services) and data 1826.

I/O interface 1830 can be configured to coordinate I/O traffic between processor(s) 1810, system memory 1820, and any peripheral devices in the device, including network interface 1840 or other peripheral interfaces (not shown). I/O interface 1830 can perform any necessary protocol, timing, or other data transformations to convert data signals from one component (e.g., system memory 1820) into a format suitable for use by another component (e.g., processor(s) 1810). I/O interface 1830 can include support for devices attached through various types of peripheral buses, such as a variant of the PERIPHERAL COMPONENT INTERCONNECT (PCI) bus standard or the UNIVERSAL SERIAL BUS (USB) standard, for example. The function of I/O interface 1830 can be split into two or more separate components, such as a north bridge and a south bridge, for example. Also, some or all of the functionality of I/O interface 1830, such as an interface to system memory 1820, can be incorporated directly into processor 1810.

Network interface 1840 can be configured to allow data to be exchanged between computer system 1800 and other devices 1860 attached to network(s) 1850, such as other computer systems or devices as illustrated in FIG. 1, for example. Network interface 1840 can support communication via any suitable wired or wireless general data networks, such as types of Ethernet network, for example. Additionally, network interface 1840 can support communication via telecommunications/telephony networks, such as analog voice networks or digital fiber communications networks, via storage area networks (SANs), such as Fibre Channel SANs, and/or via any other suitable type of network and/or protocol.

Computer system 1800 can include one or more offload cards 1870A or 1870B (including one or more processors 1875, and possibly including one or more network interfaces 1840) that are connected using I/O interface 1830 (e.g., a bus implementing a version of the PERIPHERAL COMPONENT INTERCONNECT-EXPRESS (PCI-E) standard, or another interconnect such as a QUICKPATH INTERCONNECT (QPI) or ULTRAPATH INTERCONNECT (UPI)). For example, computer system 1800 can act as a host electronic device (e.g., operating as part of a hardware virtualization service) that hosts compute resources such as compute instances, and one or more offload cards 1870A or 1870B can execute a virtualization manager that can manage compute instances that execute on the host electronic device. As an example, offload card(s) 1870A or 1870B can perform compute instance management operations, such as pausing or un-pausing compute instances, launching or terminating compute instances, performing memory transfer/copying operations, etc. These management operations can be performed by offload card(s) 1870A or 1870B in coordination with a hypervisor (e.g., upon a request from a hypervisor) that is executed by other processors 1810A-1810N of computer system 1800. However, the virtualization manager implemented by offload card(s) 1870A or 1870B can accommodate requests from other entities (e.g., from compute instances themselves).

System memory 1820 can be a computer-accessible medium configured to store program instructions and data. However, program instructions or data can be received, sent, or stored upon different types of computer-accessible media. Computer-accessible media includes non-transitory computer-accessible media and computer-accessible transmission media. Examples of non-transitory computer-accessible media includes volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

Extensions and Alternatives

In the foregoing detailed description, reference is made to examples, examples of which are illustrated in the accompanying drawings. Numerous specific details are set forth to provide a thorough understanding of the examples. However, it will be apparent to those skilled in the art that some examples can be practiced without these specific details. In other instances, well-known elements, features, acts, or operations have not been described in detail so as not to unnecessarily obscure the examples.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing description and in the appended claims in an open-ended fashion, and do not exclude additional elements, features, acts, or operations.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, features, acts, or operations, these features, acts, or operations should not be limited by these terms. These terms are only used to distinguish one element, feature, act, or operation from another. For example, a first computing device could be termed a second computing device, and, similarly, a second computing device could be termed a first computing device. The first computing device and the second computing device are both computing devices, but they are not the same computing device.

What is claimed is:

1. A method comprising:
causing a set of colors to be displayed in a sequence on a display screen of a personal computing device;
receiving a set of target images sent from the personal computing device;
detecting or tracking a face in the set of target images;
spotting a micro-facial expression in the set of target images by identifying a first target image of the set of target images containing a first micro-facial movement, identifying a second target image of the set of target images that follows the first target image in a time domain of the set of target images containing a second micro-facial movement, and identifying a third target image of the set of target images that follows the second target image in the time domain of the set of target images containing a third micro-facial movement;
determining the face is genuine based on spotting the micro-facial expression; and
authenticating, by a face recognition service in a provider network, the face.

2. The method of claim 1, further comprising:
causing a face bounding shape challenge to be displayed on the display screen of the personal computing device;
classifying motion of the face in the set of target images as genuine; and
determining the face is genuine based on classifying the motion of the face as genuine.

3. The method of claim 1, further comprising:
determining a time of the micro-facial expression in the set of target images;
determining a temporal consistency between the time of the micro-facial expression in the set of target images and a time when a first color of the color light pattern challenge is displayed on a display screen of the personal computing device; and
determining the liveness of the face based on the temporal consistency.

4. The method of claim 1, further comprising:
detecting a set of one or more facial action coding system action units in a target image of the set of target images; and
determining the face is genuine based on the set of one or more facial action coding system action units.

5. The method of claim 1, further comprising:
detecting a set of one or more facial action coding system action units in a target image of the set of target images;
determining a set of one or more intensities for the set of one or more facial action coding system action units, each intensity of the set of one or more intensities numerically indicating an intensity in the target image of one corresponding facial action coding system action unit in the set of one or more facial action coding system units; and
determining the face is genuine based on the set of one or more intensities.

6. The method of claim 1, further comprising:
determining a set of vectors for the set of target images, each vector of the set of vectors determined for one respective target image of the set of target images, each vector comprising a respective set of one or more elements, each element of the respective set of one or more elements indicating an intensity of a facial action coding system action unit detected in the respective target image;
classifying the set of vectors as representing a genuine macro-facial expression; and
determining the face is genuine based on classifying the set of vectors as representing a genuine macro-facial expression.

7. The method of claim 1, further comprising:
detecting a macro-facial expression in the set of target images; and
determining the face is a genuine face based on detecting the macro-facial expression.

8. The method of claim 1, wherein the first micro-facial movement comprises an onset of the micro-facial expression, the second micro-facial movement comprises an apex of the micro-facial expression, and the third micro-facial movement comprises an offset of the micro-facial expression.

9. The method of claim 1, wherein detecting or tracking the face in the set of target images is performed at the personal computing device.

10. The method of claim 1, wherein spotting the micro-facial expression in the set of target images comprises using a trained convolutional neural network to spot the micro-facial expression in the set of target images.

11. The method of claim 1, further comprising:
causing a face oval challenge to displayed on a display screen of a personal computing device;
determining a time of the micro-facial expression in the set of target images;
determining a temporal consistency between the time of the micro-facial expression in the set of target images and a time of display of the face oval challenge on the display screen; and
determining the liveness of the face based on the temporal consistency determined.

12. A system comprising:
a first set of one or more electronic devices to implement a liveness detection service, the liveness detection service comprising instructions which, when executed, cause the liveness detection service to:
cause a set of colors to be displayed in a sequence on a display screen of a personal computing device,
receive a set of target images sent from the personal computing device,
detect or track a face in the set of target images,
detect a set of one or more facial action coding system action units in a target image of the set of target images;
determine the face is a genuine face and not an impersonated face based on the set of one or more facial action coding system action units; and
request a face recognition service to authenticate the genuine face; and
a second set of one or more electronic devices to implement a face recognition service, the face recognition service comprising instructions which, when executed, cause the face recognition service to:

receive the request from the liveness detection service to authenticate the genuine face, and authenticate the genuine face.

13. The system of claim 12, wherein the liveness detection service further comprises instructions which, when executed, cause the liveness detection service to:
cause a face bounding shape challenge to be displayed on the display screen of the personal computing device;
classify motion of the face in the set of target images as genuine face motion and not impersonated face motion; and
determine the face is a genuine face and not an impersonated face based on classifying the motion of the face in the set of target images as genuine face motion and not impersonated face motion.

14. The system of claim 12, wherein the liveness detection service further comprises instructions which, when executed, cause the liveness detection service to:
determine a time of the micro-facial expression in the set of target images;
determine a temporal consistency between the time of the micro-facial expression in the set of target images and a time when a first color of the color light pattern challenge is displayed on a display screen of the personal computing device; and
determining the face is genuine face and not an impersonated face based on the temporal consistency determined.

15. The system of claim 12, wherein the liveness detection service further comprises instructions which, when executed, cause the liveness detection service to:
detect a set of one or more facial action coding system action units in a target image of the set of target images;
determine a set of one or more intensities for the set of one or more facial action coding system action units, each intensity of the set of one or more intensities numerically indicating an intensity in the target image of one corresponding facial action coding system action unit in the set of one or more facial action coding system units; and
determine the face is a genuine face and not an impersonated face based on the set of one or more intensities.

16. The system of claim 12, wherein the liveness detection service further comprises instructions which, when executed, cause the liveness detection service to:
determining a set of vectors for the set of target images, each vector of the set of vectors determined for one respective target image of the set of target images, each vector comprising a respective set of one or more elements, each element of the respective set of one or more elements indicating an intensity of a facial action coding system action unit detected in the respective target image;
classifying the set of vectors as representing a genuine macro-facial expression; and
determining the face is a genuine face and not an impersonated face based on classifying the set of vectors as representing a genuine macro-facial expression.

17. A method comprising:
causing a set of colors to be displayed in a sequence on a display screen of a personal computing device;
receiving a set of target images sent from the personal computing device;
detecting or tracking a face in the set of target images;
spotting a micro-facial expression in the set of target images;
determining a temporal consistency between a time of the micro-facial expression in the set of target images and a time when a first color of the set of colors is displayed on the display screen of the personal computing device; and
determining a liveness of the face based on the temporal consistency.

18. The method of claim 17, further comprising:
detecting a set of one or more facial action coding system action units in a target image of the set of target images; and
determining the face is genuine based on the set of one or more facial action coding system action units.

19. The method of claim 17, further comprising:
determining a set of vectors for the set of target images, each vector of the set of vectors determined for one respective target image of the set of target images, each vector comprising a respective set of one or more elements, each element of the respective set of one or more elements indicating an intensity of a facial action coding system action unit detected in the respective target image;
classifying the set of vectors as representing a genuine macro-facial expression; and
determining the face is genuine based on classifying the set of vectors as representing a genuine macro-facial expression.

20. The method of claim 17, further comprising:
detecting a macro-facial expression in the set of target images; and
determining the face is a genuine face based on detecting the macro-facial expression.

* * * * *